(12) United States Patent
Rikitake et al.

(10) Patent No.: US 9,026,858 B2
(45) Date of Patent: May 5, 2015

(54) TESTING SERVER, INFORMATION PROCESSING SYSTEM, AND TESTING METHOD

(71) Applicant: Fujitsu Limited, Kawasaki-shi, Kanagawa (JP)

(72) Inventors: Susumu Rikitake, Yokohama (JP); Ikuo Shimada, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 14/305,036

(22) Filed: Jun. 16, 2014

(65) Prior Publication Data
US 2014/0298082 A1    Oct. 2, 2014

Related U.S. Application Data

(63) Continuation of application No. PCT/JP2011/079742, filed on Dec. 21, 2011.

(51) Int. Cl.
G06F 11/22      (2006.01)
G06F 11/20      (2006.01)

(52) U.S. Cl.
CPC ........ *G06F 11/2007* (2013.01); *G06F 11/2215* (2013.01)

(58) Field of Classification Search
CPC . G06F 11/008; G06F 11/2092; G06F 11/261; G06F 11/2007
USPC ........................................................ 714/41
See application file for complete search history.

(56) References Cited

U.S. PATENT DOCUMENTS

| | | | |
|---|---|---|---|
| 6,484,276 B1 * | 11/2002 | Singh et al. | 714/41 |
| 7,370,101 B1 * | 5/2008 | Lakkapragada et al. | 709/223 |
| 2008/0133963 A1 | 6/2008 | Katano et al. | |
| 2010/0318838 A1 | 12/2010 | Katano et al. | |

FOREIGN PATENT DOCUMENTS

| | | |
|---|---|---|
| JP | 56-021253 | 2/1981 |
| JP | 03-253945 | 11/1991 |
| JP | 07-262101 | 10/1995 |
| JP | 2000-057108 | 2/2000 |
| JP | 2008-140198 | 6/2008 |

OTHER PUBLICATIONS

International Search Report, mailed in connection with PCT/JP2011/079742 and mailed Apr. 10, 2012.

* cited by examiner

*Primary Examiner* — Chae Ko
(74) *Attorney, Agent, or Firm* — Fujitsu Patent Center

(57) ABSTRACT

A testing server performs a test to check whether servers properly execute failover. The testing server includes a generation unit, a transmitting unit, a testing unit, a restoring unit, a judgment unit, and a power control unit. The generation unit generates an image file of an OS. The transmitting unit transmits the image file to to-be-tested servers. The testing unit injects a simulated fault into a server among the servers to which the image file is transmitted and performs a test. The restoring unit, each time the testing unit performs a test, restores a status of the to-be-tested server to a pre-failover status. The judgment unit judges whether the restoring unit properly restores the status. The power control unit, when the judgment unit judges that the status of the to-be-tested server is not properly restored, turns off power of the to-be-tested server and turns on the power again.

9 Claims, 18 Drawing Sheets

FIG.3

```
Failover TEST SYSTEM
                (Enter To Select)
Test Using Server Select:
[*] ALL
    [*]  Server #1
    [*]  Server #2
      :    :
    [*]  Server #N Fail Over Type&Error Target

[*] All
        [*]2ServerConfigration
           [*] Active-Passive
              [*] (Active)
              [*] (Passive)
           [ ] Active-Active
        [*] LargeServerConfiguration
           [*] HotStanbyServer
              [*] (Active)
              [*] (Passive)
           [ ] N+I
           [ ] FailOverRing
           [ ] Ramdom Active Service:
[ ] All
[*] Service
   [*] http
   [*] ftp
     :
   [ ] telnet Error Setting:
[*] Service
   [*] http
       [*] Service Error Type
       [*] Service Hung
       [ ] Service Stop
       [ ] Service Slow Down
   [ ] ftp
   [ ] telnet
[*] Hard
   [ ] DISK
   [ ] CPU
   [*] MEMORY
   [ ] LAN
     :
```

FIG.4

| TYPE OF FAILOVER | NUMBER OF SERVERS | |
|---|---|---|
| | OPERATING | STANDBY |
| Active-passive | 1 | 1 |
| Active-Active | 2 | 0 |
| N-TO-1 | 2 | 1 |
| | 3 | 1 |

FIG.5

| TYPE OF FAILOVER | NUMBER OF SERVERS | | ACTIVATED SERVICE FOR EACH OPERATING SERVER | | | STANDBY SERVER Server #4 |
|---|---|---|---|---|---|---|
| | OPERA-TING | STAND-BY | Server #1 | Server #2 | Server #3 | |
| Active-passive | 1 | 1 | A, B, C | (※UN-USED) | (※UN-USED) | STANDBY SERVER |
| Active-Active | 2 | 0 | A, B, C | A, B, C | (※UN-USED) | (※UN-USED) |
| N-TO-1 | 2 | 1 | A, B | C | (※UN-USED) | STANDBY SERVER |
| | 2 | 1 | A | B, C | (※UN-USED) | STANDBY SERVER |
| | 3 | 1 | A | B | C | STANDBY SERVER |

FIG.6

| TYPE OF FAIL-OVER | NUMBER OF SERVERS | | ACTIVATED SERVICE FOR EACH OPERATING SERVER | | | STANDBY SERVER Server #4 | ERROR INJECTION | |
|---|---|---|---|---|---|---|---|---|
| | OPERAT-ING | STAND-BY | Server #1 | Server #2 | Server #3 | | TYPE | INJECTION DESTINA-TION |
| Active-passive | 1 | 1 | A, B, C | (※UN-USED) | (※UN-USED) | STANDBY SERVER | CPU | Server #1 |
| | | | | | | | DIMM | Server #1 |
| | | | | | | | CPU | Server #4 |
| | | | | | | | DIMM | Server #4 |
| Active-Active | 2 | 0 | A, B, C | A, B, C | (※UN-USED) | (※UN-USED) | CPU | Server #1 |
| | | | | | | | DIMM | Server #1 |
| | | | | | | | CPU | Server #2 |
| | | | | | | | DIMM | Server #2 |
| N-TO-1 | 2 | 1 | A, B | C | (※UN-USED) | STANDBY SERVER | CPU | Server #1 |
| | | | | | | | DIMM | Server #1 |
| | | | | | | | CPU | Server #2 |
| | | | | | | | DIMM | Server #2 |
| | | | | | | | CPU | Server #4 |
| | | | | | | | DIMM | Server #4 |
| | | | A | B, C | (※UN-USED) | STANDBY SERVER | CPU | Server #1 |
| | | | | | | | DIMM | Server #1 |
| | | | | | | | CPU | Server #2 |
| | | | | | | | DIMM | Server #2 |
| | | | | | | | CPU | Server #4 |
| | | | | | | | DIMM | Server #4 |
| | 3 | 1 | A | B | C | STANDBY SERVER | CPU | Server #1 |
| | | | | | | | DIMM | Server #1 |
| | | | | | | | CPU | Server #2 |
| | | | | | | | DIMM | Server #2 |
| | | | | | | | CPU | Server #3 |
| | | | | | | | DIMM | Server #3 |
| | | | | | | | CPU | Server #4 |
| | | | | | | | DIMM | Server #4 |

FIG.7

| TYPE OF FAIL-OVER | NUMBER OF SERVERS | | ACTIVATED SERVICE FOR EACH OPERATING SERVER | | | STANDBY SERVER Server #4 | ERROR INJECTION | |
|---|---|---|---|---|---|---|---|---|
| | OPERAT-ING | STAND-BY | Server #1 | Server #2 | Server #3 | | TYPE | INJECTION DESTINA-TION |
| Active-passive | 1 | 1 | A, B, C | (※UN-USED) | (※UN-USED) | STANDBY SERVER | A HUNG | Server #1 |
| | | | | | | | B HUNG | Server #1 |
| | | | | | | | C HUNG | Server #1 |
| Active-Active | 2 | 0 | A, B, C | A, B, C | (※UN-USED) | (※UN-USED) | A HUNG | Server #1 |
| | | | | | | | B HUNG | Server #1 |
| | | | | | | | C HUNG | Server #1 |
| | | | | | | | A HUNG | Server #2 |
| | | | | | | | B HUNG | Server #2 |
| | | | | | | | C HUNG | Server #2 |
| N-TO-1 | 2 | 1 | A, B | C | (※UN-USED) | STANDBY SERVER | A HUNG | Server #1 |
| | | | | | | | B HUNG | Server #1 |
| | | | | | | | C HUNG | Server #2 |
| | | | A | B, C | (※UN-USED) | STANDBY SERVER | A HUNG | Server #1 |
| | | | | | | | B HUNG | Server #2 |
| | | | | | | | C HUNG | Server #2 |
| | 3 | 1 | A | B | C | STANDBY SERVER | A HUNG | Server #1 |
| | | | | | | | B HUNG | Server #2 |
| | | | | | | | C HUNG | Server #3 |

FIG.8

| SERVER | HARDWARE CONFIGURATION | | | | DIAGNOSIS | | | | POSSIBILITY ABOUT TEST SUBJECT |
|---|---|---|---|---|---|---|---|---|---|
| | HDD | CPU | DIMM | LAN | HDD | CPU | DIMM | LAN | |
| Server #1 | 128GB×2 | 1 | 2G×2 | 1Gbps×2 | OK | OK | OK | OK | POSSIBLE |
| Server #2 | 128GB×2 | 1 | 2G×2 | 1Gbps×2 | OK | OK | OK | OK | POSSIBLE |
| Server #3 | 128GB×2 | 1 | 2G×2 | 1Gbps×2 | OK | OK | OK | OK | POSSIBLE |
| Server #4 | 128GB×2 | 1 | 2G×2 | 1Gbps×2 | OK | OK | OK | OK | POSSIBLE |
| Server #5 | 128GB×2 | 1 | 2G×2 | 1Gbps×2 | OK | OK | OK | OK | POSSIBLE |
| Server #6 | DISK-LESS | 1 | 2G×2 | 1Gbps×2 | - | OK | OK | OK | POSSIBLE |
| Server #7 | 128GB×2 | 1 | 2G×2 | 1Gbps×2 | NG | OK | OK | OK | POSSIBLE |
| Server #8 | 128GB×2 | 1 | 2G×2 | 10Gbps×2 | OK | OK | NG | OK | NOT POSSIBLE (DIMM FAILURE) |

FIG.9

| TEST NUMBER | TYPE OF FAILOVER | SUBJECT SERVER #1 | SUBJECT SERVER #2 | SUBJECT SERVER #3 | ERROR INJECTION DESTINATION | TYPE |
|---|---|---|---|---|---|---|
| 1 | active-passive | telnet, http | STANDBY | | UBJECT SERVER #1 | CPU |
| 2 | | telnet, http | STANDBY | | UBJECT SERVER #1 | STOP telnet |
| 3 | | telnet, http | STANDBY | | SUBJECT SERVER #2 | CPU |
| 4 | active-active | telnet | http | | UBJECT SERVER #1 | CPU |
| 5 | | telnet | http | | UBJECT SERVER #1 | STOP telnet |
| 6 | | telnet | http | | SUBJECT SERVER #2 | CPU |
| 7 | N-TO-1 | telnet | http | STANDBY | UBJECT SERVER #1 | CPU |
| 8 | | telnet | http | STANDBY | UBJECT SERVER #1 | STOP telnet |
| 9 | | telnet | http | STANDBY | SUBJECT SERVER #2 | CPU |
| 10 | | telnet | http | STANDBY | SUBJECT SERVER #3 | CPU |

FIG.10

| TEST NUM-BER | REQUIRED HARDWARE #1 | | | | REQUIRED HARDWARE #2 | | | | REQUIRED HARDWARE #3 | | | | REQUIRED NUMBER OF SERVERS |
|---|---|---|---|---|---|---|---|---|---|---|---|---|---|
| | HDD | CPU | DIMM | LAN | HDD | CPU | DIMM | LAN | HDD | CPU | DIMM | LAN | |
| 1 | 0 | 1 | 1 | 1G | 0 | 1 | 1 | 1G | | | | | 2 |
| 2 | 0 | 1 | 1 | 1G | 0 | 1 | 1 | 1G | | | | | 2 |
| 3 | 0 | 1 | 1 | 1G | 0 | 1 | 1 | 1G | | | | | 2 |
| 4 | 0 | 1 | 1 | 1G | 0 | 1 | 1 | 1G | | | | | 2 |
| 5 | 0 | 1 | 1 | 1G | 0 | 1 | 1 | 1G | | | | | 2 |
| 6 | 0 | 1 | 1 | 1G | 0 | 1 | 1 | 1G | | | | | 2 |
| 7 | 0 | 1 | 1 | 1G | 0 | 1 | 1 | 1G | 0 | 1 | 1 | 1G | 3 |
| 8 | 0 | 1 | 1 | 1G | 0 | 1 | 1 | 1G | 0 | 1 | 1 | 1G | 3 |
| 9 | 0 | 1 | 1 | 1G | 0 | 1 | 1 | 1G | 0 | 1 | 1 | 1G | 3 |
| 10 | 0 | 1 | 1 | 1G | 0 | 1 | 1 | 1G | 0 | 1 | 1 | 1G | 3 |

FIG.11

| SERVER | FIRST TIME | SECOND TIME | THIRD TIME | FOURTH TIME |
|---|---|---|---|---|
| Server #1 | TEST NUMBER 7 | TEST NUMBER 8 | TEST NUMBER 9 | TEST NUMBER 10 |
| Server #2 | TEST NUMBER 7 | TEST NUMBER 8 | TEST NUMBER 9 | TEST NUMBER 10 |
| Server #3 | TEST NUMBER 7 | TEST NUMBER 8 | TEST NUMBER 9 | TEST NUMBER 10 |
| Server #4 | TEST NUMBER 1 | TEST NUMBER 3 | TEST NUMBER 5 | |
| Server #5 | TEST NUMBER 1 | TEST NUMBER 3 | TEST NUMBER 5 | |
| Server #6 | TEST NUMBER 2 | TEST NUMBER 4 | TEST NUMBER 6 | |
| Server #7 | TEST NUMBER 2 | TEST NUMBER 4 | TEST NUMBER 6 | |

FIG.12

| Failover TEST SYSTEM |
|---|
| (Enter To Select) |
| <<Test result summary>><br>TestNum: 10<br>Pass: 9<br>Fail: 1<br><br><< Fail Test >> |
| TEST NO_9: |
| <<TEST Setting Value>><br>    Fail Over Type: N-1<br>    Active Server: 1, 2<br>    Passive Server: 3<br>    active Service<br>     Server 1: telnet<br>     Server 2: http<br>     Server 3: nothing<br>    Error Target: Server 2<br>    Error Type: CPU Error |
| <<TEST Error Cause >><br>    DIMM degraded after Test.<br>[detail]<br><br>⋮ |
| [end] |

US 9,026,858 B2

TESTING SERVER, INFORMATION PROCESSING SYSTEM, AND TESTING METHOD

CROSS-REFERENCE TO RELATED APPLICATION(S)

This application is a continuation of International Application No. PCT/JP2011/079742, filed on Dec. 21, 2011, the entire contents of which are incorporated herein by reference.

FIELD

The embodiments discussed herein are directed to a testing server, an information processing system, and a testing method.

BACKGROUND

Conventionally, an information processing system with a plurality of servers has a failover capability with which, when any server has a fault, another server takes over the operation that is performed by the faulty server so as to prevent the service from being stopped.

An explanation is given below, with reference to FIGS. 18A to 18D, of an example of the failover capability. FIG. 18A is a diagram that illustrates a failover capability in an Active-passive mode. For instance, in the example illustrated in FIG. 18A, an information processing system includes an operating server #1 that provides a service A and a service B and includes a standby server #2 that does not provide any services. In this information processing system, if an error occurs in the server #1, the server #2 takes over the provision of the service A and the service B, whereby each of the services is continuously provided.

FIG. 18B is a diagram that illustrates a failover capability in an Active-Active mode. In the example illustrated in FIG. 18B, the information processing system includes the server #1 that provides the service A and the server #2 that provides the service B. In this information processing system, if an error occurs in the server #1, the server #2 takes over the provision of the service A, whereby each of the services is continuously provided.

FIG. 18C is a diagram that illustrates a failover capability in an N-to-1 mode. In the example illustrated in FIG. 18C, the information processing system includes the server #1 that provides the service A, the server #2 that provides the service B, a server #3 that provides a service C, and a standby server #4. In this information processing system, if an error occurs in the server #1, the standby server #4 takes over the provision of the service A, whereby each of the services is continuously provided.

FIG. 18D is a diagram that illustrates a ring-type failover capability. In the example illustrated in FIG. 18D, the information processing system includes the server #1 that provides the service A, the server #2 that provides the service B, the server #3 that provides the service C, and the server #4 that provides a service D. In this information processing system, if an error occurs in any of the servers #1 to #4, a different server that is specified in a ring form takes over the service that is provided by the server where the error occurs, whereby each of the services is continuously provided. For example, in the information processing system, if an error occurs in the server #1, the server #2 takes over the provision of the service A, whereby each of the services is continuously provided.

Furthermore, there is a known technology of injecting a simulated fault into a server that is included in an information processing system so as to perform a test to check whether the failover capability applied to the information processing system is properly implemented. For example, there is a known technology in which a simulated fault is generated in a server that is included in the information processing system by using a jig, such as a clip, or software for generating a simulated fault, and a test is performed to check whether the failover capability is properly implemented.

An explanation is given below, with reference to FIG. 19, of an example of the technology for performing a test to check whether the failover capability is properly implemented. FIG. 19 is an example of a flowchart that illustrates the steps of a cluster failover test. In the example illustrated in FIG. 19, an explanation is given of a case where a user performs a test to check whether a plurality of failover capabilities is properly implemented.

For example, a user designs a cluster of servers that are the subjects for a test (Step S1). Next, the user prepares for the servers that constitute the designed cluster (Step S2) and installs an OS (Operation System) in each of the servers (Step S3).

The user then makes settings for the failover capability and the service to be implemented by each of the servers (Step S4). The user then uses a jig or software to inject a simulated fault into a server so as to generate an error (Step S5). Afterward, the user checks whether the set failover capability is properly implemented (Step S6).

Next, the user performs a failback operation to restore the status of the information processing system to the pre-error status (Step S7). Furthermore, the user determines whether a test has been performed on all of the failover capabilities (Step S8) and, if a test has been performed on all of the failover capabilities (Yes at Step S8), the test for the failover capability is terminated.

Here, in some cases, damage occurs in data that is stored in the HDD (Hard Disk Drive) included in the server due to the type of injected fault, the OS is not properly operated and, as a result, a failback operation is not performed. Therefore, if a test has not been performed on all of the failover capabilities (No at Step S8), the user determines whether damage occurs in the data stored in the HDD of each of the servers (Step S9).

If damage occurs in the data stored in the HDD of any of the servers (Yes at Step S9), the user returns to Step S3 so as to reinstall the OS (Step S3). Conversely, if damage does not occur in the data stored in the HDD of each of the servers (No at Step S9), the user returns to Step S5 so as to inject a simulated fault into the server and generate an error (Step S5). As to the specific details of technologies as described about, see Japanese Laid-open Patent Publication No. 2000-057108, Japanese Laid-open Patent Publication No. 56-021253, and Japanese Laid-open Patent Publication No. 07-262101, for example.

However, in the technology of injecting a fault by using a jig, software, or the like, if damage occurs in the data that is stored in the HDD of any of the servers, the OS is reinstalled; therefore, there is a problem in that the failover capability is not continuously tested.

For example, the OS data is sometimes damaged if the power source of a server is forcibly turned off while data is written in the HDD included in the server or if uncorrectable data is injected into the HDD. In such a case, as the user does not perform a failback operation properly, the user reinstalls the OS. As a result, the user does not continuously test the failover capability.

SUMMARY

According to an aspect of an embodiment, a testing server performs a test to check whether a plurality of servers properly executes failover. The testing server includes a generation unit, a transmitting unit, a testing unit, a restoring unit, a judgment unit, and a power control unit. The generation unit generates an image file of an OS (Operation System) that is executed by a to-be-tested server. The transmitting unit transmits the image file that is generated by the generation unit to to-be-tested servers. The testing unit injects a simulated fault into a server where a fault occurs among the servers to which the transmitting unit transmits the image file and that performs a test to check whether the to-be-tested server properly executes failover. The restoring unit, each time the testing unit performs a test, restores a status of the to-be-tested server to a pre-failover status. The judgment unit judges whether the restoring unit properly restores the status of the to-be-tested server. The power control unit, when the judgment unit judges that the status of the to-be-tested server is not properly restored, turns off power of the to-be-tested server and then turns on the power again. With respect to the server whose power is turned on again by the power control unit, the transmitting unit transmits an image file and the testing unit performs a test in a repetitive manner.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 is a diagram that illustrates an example of a test-content selection screen;

FIG. 4 is a diagram that illustrates an example of a list 1 that is generated by a failover diagnosis system according to the first embodiment;

FIG. 5 is a diagram that illustrates an example of a list 2 that is generated by the failover diagnosis system according to the first embodiment;

FIG. 6 is a diagram that illustrates an example of a list 3 that is generated by the failover diagnosis system according to the first embodiment;

FIG. 7 is a diagram that illustrates an example of a list 4 that is generated by the failover diagnosis system according to the first embodiment;

FIG. 8 is a diagram that illustrates an example of information that is collected by a management server according to the first embodiment;

FIG. 9 is a diagram that illustrates an example of a test that is performed by the management server according to the first embodiment;

FIG. 10 is a diagram that illustrates an example of a table that is generated by the management server according to the first embodiment;

FIG. 11 is a diagram that illustrates an example of a test that the management server according to the first embodiment causes each server to perform;

FIG. 12 is a diagram that illustrates an example of a test result that is presented to a user by the management server according to the first embodiment;

DESCRIPTION OF EMBODIMENTS

Preferred embodiments of the present invention will be explained with reference to accompanying drawings.

[a] First Embodiment

Figure 1:
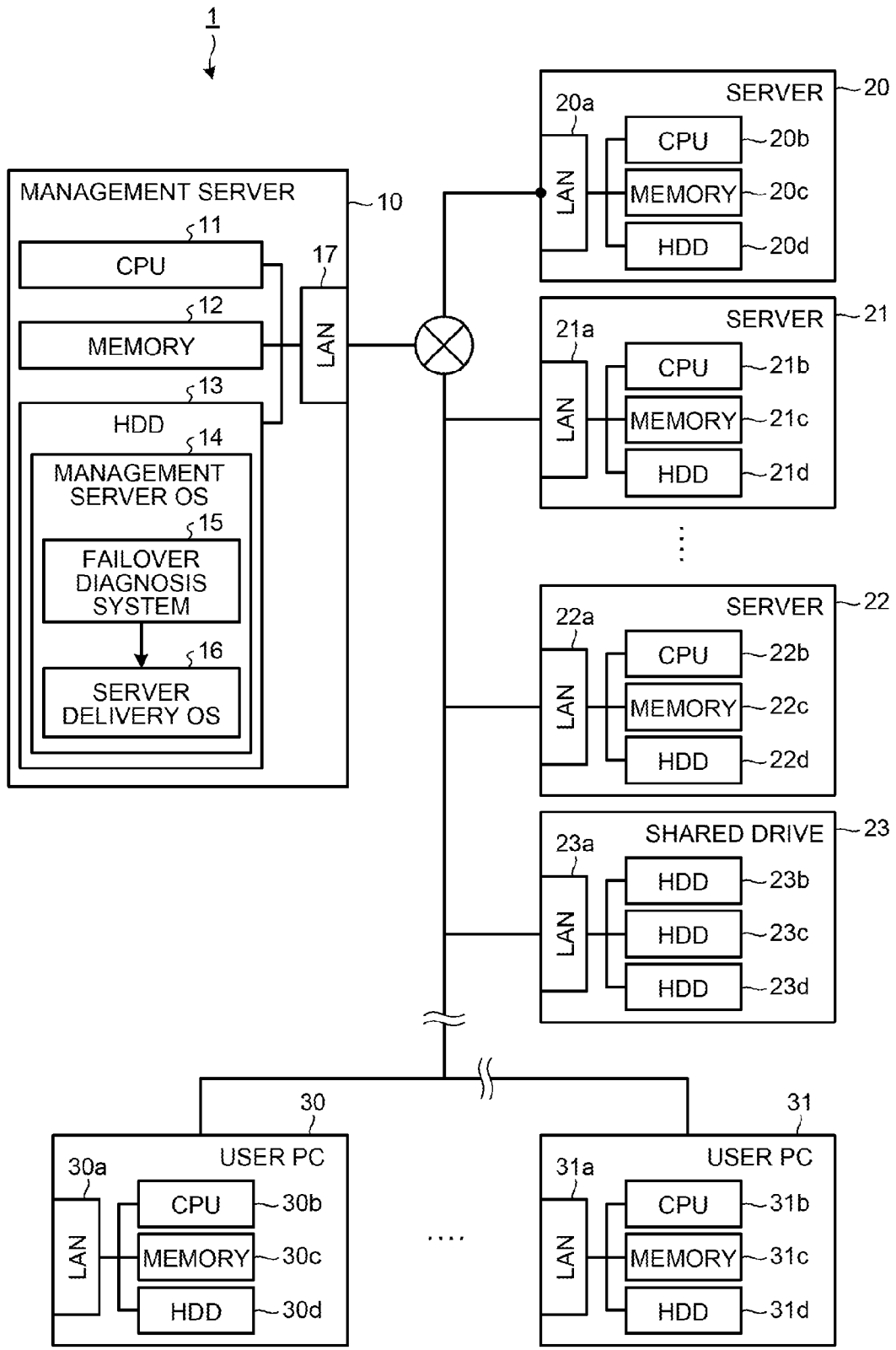
FIG. 1 is a diagram that illustrates an information processing system according to a first embodiment.

In the following first embodiment, an explanation is given, with reference to FIG. 1, of an example of an information processing system that includes a plurality of servers that has a failover capability and includes a management server that performs a test to check whether each of the servers properly implements the failover capability. FIG. 1 is a diagram that illustrates the information processing system according to the first embodiment.

As illustrated in FIG. 1, an information processing system 1 includes a management server 10, a plurality of servers 20 to 22, a shared drive 23, and a plurality of user PCs (Personal Computers) 30 to 31. The management server 10 includes a CPU (Central Processing Unit) 11, a memory 12, an HDD (Hard Disk Drive) 13, and a LAN card (Local Area Network Card) 17. Furthermore, the HDD 13 stores a management server OS 14 that is an OS (Operation System) that is executed by the management server. The management server OS 14 includes a failover diagnosis system 15 and a server delivery OS 16.

The server 20 includes a LAN card 20a, a CPU 20b, a memory 20c, and an HDD 20d. Furthermore, the server 21 and the server 22 also include LAN cards 21a, 22a, CPUs 21b, 22b, memories 21c, 22c, and HDDs 21d, 22d.

Furthermore, the shared drive 23 is a shared drive that includes HDDs 23b to 23d that are shared by the servers 20 to 22 via a LAN card 23a and the LAN. Furthermore, the user PCs 30, 31 are the information processing apparatuses that include LAN cards 30a, 31a, CPUs 30b, 31b, memories 30c, 31c, and HDDs 30d, 31d and that receive services provided by the servers 20 to 22 via the LAN.

In the above information processing system 1, the management server 10 performs a test to check whether each of the servers 20 to 22 properly performs failover. Specifically, the management server 10 generates an image file of the OS that is executed by, among the servers 20 to 22, a server that is the subject for a failover test. The management server 10 then transmits the generated image file to the to-be-tested server.

Here, each of the servers 20 to 22 has a function to perform network booting by using the image file that is generated by the management server 10. Therefore, if the servers 20 to 22 acquire the image file that is transmitted by the management server 10, they store the acquired image file in the memories 20c to 22c and perform network booting.

The management server 10 then injects a simulated fault into any of the servers 20 to 22 and causes failover to be performed. The management server 10 then determines whether each of the servers 20 to 22 properly performs failover.

Thus, the management server 10 is capable of continuously performing tests to check whether each of the servers 20 to 22 properly performs failover. For example, the management server 10 injects a simulated fault into the server 20 and determines whether failover is properly executed. Furthermore, if the management server 10 continuously performs tests, the management server 10 causes the to-be-tested server to perform failback and, if failback is not properly performed, it transmits the image file of the OS to the to-be-tested server again and causes it to perform network booting.

Thus, the management server 10 does not need to install the OS in each of the servers 20 to 22 even if data stored in the HDDs 20d to 22d of the servers 20 to 22 has been lost as a result of execution of failover tests and failback has not been properly performed. Accordingly, the management server 10 is capable of continuously performing failover tests.

Figure 2:
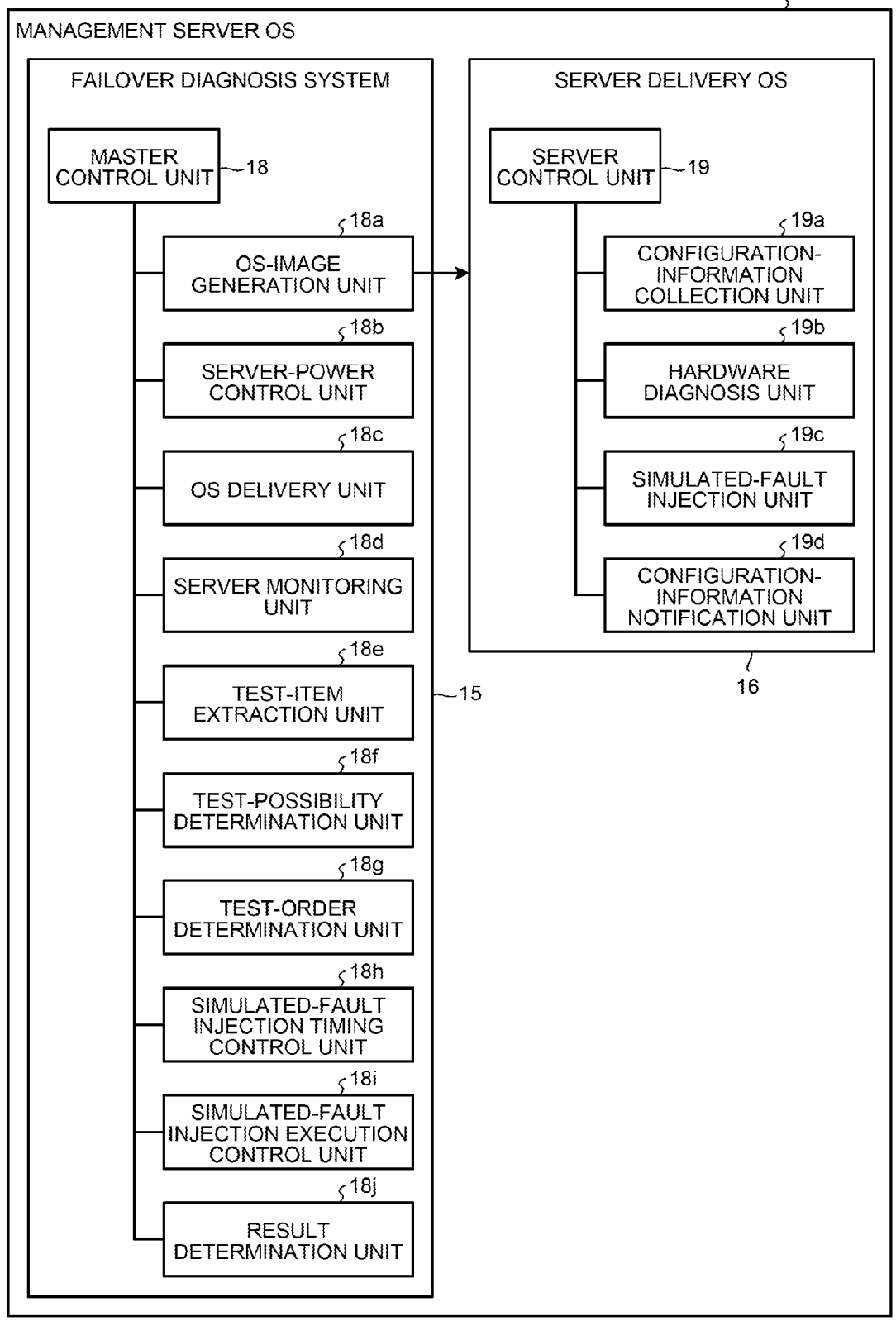
FIG. 2 is a diagram that illustrates a functional configuration of a management server OS according to the first embodiment.

Next, an explanation is given, with reference to FIG. 2, of the management server OS 14 that is executed by the management server 10. FIG. 2 is a diagram that illustrates a functional configuration of the management server OS according to the first embodiment. In the example illustrated in FIG. 2, the management server OS 14 includes the failover diagnosis system 15 and the server delivery OS 16.

The failover diagnosis system 15 includes a master control unit 18, an OS-image generation unit 18a, a server-power control unit 18b, an OS delivery unit 18c, a server monitoring unit 18d, a test-item extraction unit 18e, a test-possibility determination unit 18f, and a test-order determination unit 18g. The failover diagnosis system 15 further includes a simulated-fault injection timing control unit 18h, a simulated-fault injection execution control unit 18i, and a result determination unit 18j. Furthermore, the server delivery OS 16 includes a server control unit 19, a configuration-information collection unit 19a, a hardware diagnosis unit 19b, a simulated-fault injection unit 19c, and a configuration-information notification unit 19d.

First, an explanation is given of an operation performed by each of the units 18 to 18j that are included in the failover diagnosis system 15. The master control unit 18 controls each of the units 18a to 18j so as to perform the following operation. Specifically, the master control unit 18 generates the server delivery OS 16 that is transmitted to each of the servers 20 to 22. Furthermore, the master control unit 18 generates the contents of a test in accordance with a user's designation and selects a server that is the subject for the test. The master control unit 18 then transmits the generated server delivery OS 16 to the selected server and causes it to perform network booting.

Afterward, the master control unit 18 determines whether all of the generated contents of the test have been executed and, if there is a content of the test that has not been executed, it performs the following operation. Specifically, the master control unit 18 generates the server delivery OS 16 for performing a new test. Furthermore, the master control unit 18 causes each of the servers 20 to 22 to perform failback. Moreover, if failback is not properly performed, the master control unit 18 turns off the power of the to-be-tested server and then turns it on again. The master control unit 18 then transmits the new server delivery OS 16 to the to-be-tested server.

A detailed explanation is given below of an operation performed by the master control unit 18 using the units 18a to 18j. First, an explanation is given of an operation performed by each of the units 18a to 18j. The OS-image generation unit 18a generates an image file of the server delivery OS 16. Specifically, the OS-image generation unit 18a generates the server delivery OS 16 that has a function to collect the hardware information that is included in a server and a function to perform diagnosis to determine whether each hardware properly operates.

Furthermore, the OS-image generation unit 18a generates the server delivery OS 16 that has a function to transmit the collected information and the diagnosis to the management server 10 and a function to inject a simulated fault into a server. Moreover, the OS-image generation unit 18a generates the server delivery OS 16 that has a function to perform failover. Moreover, the OS-image generation unit 18a generates the server delivery OS 16 that has a function to perform failback so as to restore the status of a server to the pre-failover status in accordance with an instruction of the management server 10. The OS-image generation unit 18a then generates an image file of the generated server delivery OS 16.

The server-power control unit 18b remotely controls the power of each of the servers 20 to 22. For example, the server-power control unit 18b turns on the power of the to-be-tested server by using a technique, such as Wake on LAN or IPMI (Intelligent Platform Management Interface). Furthermore, if a failback operation is not properly performed after the test, the server-power control unit 18b turns off the power of the to-be-tested server and then turns it on again so as to reboot it.

The OS delivery unit 18c transmits the image file of the server delivery OS 16 to the servers 20 to 22 that perform network booting by using the image file of the server delivery OS 16. An explanation is given below of an example of an operation performed when the OS delivery unit 18c transmits the image file of the server delivery OS 16. In the following explanation, each of the servers 20 to 22 performs network booting by using a PXE (Preboot Execution Environment) boot technique. Furthermore, in the following explanation, the management server OS 14 that is executed by the management server 10 has a function to operate as a DHCP (Dynamic Host Configuration Protocol) server.

For example, the to-be-tested server among the servers 20 to 22, i.e., the server whose power is turned on by the server-power control unit 18b, performs the following operation. Specifically, the server requests the management server 10, which operates as the DHCP (Dynamic Host Configuration Protocol) server, to assign an IP (Internet Protocol) address. In this case, the management server 10 assigns an IP address to the server that has requested it, i.e., the to-be-tested server.

Furthermore, the OS delivery unit 18c transmits an NBP (Network Bootstrap Program) to the server whose power is turned on by the server-power control unit 18b. In such a case, after acquiring the NBP, the server requests to acquire the server delivery OS 16 by using a TFTP (Trivial File Transfer Protocol). In this case, the OS delivery unit 18c transmits the image file of the server delivery OS 16 to the server that has requested it. As a result, each of the servers 20 to 22 performs the server delivery OS 16 by network booting.

The server monitoring unit 18*d* monitors the status of the server to which the server delivery OS 16 is delivered. For example, as described below, the server monitoring unit 18*d* collects the information that is collected by the configuration-information collection unit 19*a* of the server delivery OS 16 and the hardware diagnosis obtained by the hardware diagnosis unit 19*b*. Then, the server monitoring unit 18*d* uses the collected information and diagnosis to determine the status of each hardware included in the server delivery OS 16, the provided service, the information, such as the monitoring result obtained by the server, or the like.

In accordance with the information that is collected by the server monitoring unit 18*d* and the contents of the test that is designated by a user, the test-item extraction unit 18*e* selects the test item to be executed and the server that performs the test of the designated item. An explanation is given below, with reference to FIG. 3, of an example of an operation performed by the test-item extraction unit 18*e* to select a test item and a server. FIG. 3 is a diagram that illustrates an example of a test-content selection screen.

For example, if a user designates the contents of a test by using the screen illustrated in FIG. 3, the test-item extraction unit 18*e* determines the contents of the test that is designated by the user. In the example illustrated in FIG. 3, the user of the management server 10 uses "*" in FIG. 3 to select the server that is the subject for the test, the type of failover to be executed, the simulated fault to be injected, and the contents of the test.

For example, "Test Using Server Select:" in FIG. 3 is the range for designating a server that is the subject for the test. In the example illustrated in FIG. 3, a user selects "ALL" that indicates that all of the servers are the subjects for the test. Here, Server#1 indicates the server 20, Server#2 indicates the server 21, and Server#N indicates the server 22.

Furthermore, "FailOverType&ErrorTarget" in FIG. 3 is the screen for designating the type of failover to be executed by the server that is the subject for the test and the type of simulated fault to be injected into the to-be-tested server. In the example illustrated in FIG. 3, "ALL" is selected to cause the to-be-tested server to execute all of the types of failover.

Furthermore, "2Server Configuration" indicates the type of failover to be executed by two servers, and "LargeServer-Configuration" indicates the type of failover to be executed by three or more servers. Moreover, "Active Service:" is the range for designating the contents of the service that is implemented by the to-be-tested server. In the example illustrated in FIG. 3, selections are made such that the to-be-tested server provides the services of http (HyperText Transfer Protocol) and ftp (File Transfer Protocol).

Furthermore, "Error Setting:" is the range for designating the type of simulated fault to be injected into the to-be-tested server. Here, "Service" of "Error Setting:" is the screen for designating an error for the service provided by the server, i.e., a simulated error to be injected into the software executed by the server.

Furthermore, "Hard" is the screen for designating a simulated error to be injected into the hardware that is included in the server. In the example illustrated in FIG. 3, selections are made such that a simulated error is inserted into the http service as an error for a service and a simulated error is inserted into the memory as an error for the hardware.

The test-item extraction unit 18*e* extracts the type of failover that is the subject for a test, the server that is the subject for a test, the type of service to be provided, and the type of simulated error to be injected, which are designated by a user. The test-item extraction unit 18*e* then uses the extracted type of failover to generate a list 1 that indicates the numbers of to-be-tested operating servers and standby servers.

Specifically, the numbers of operating servers and standby servers employed for a test are changed depending on the type of failover that is the subject for the test. For example, in the case of testing failover in the Active-passive mode, each of the numbers of operating servers and standby servers is more than one. Furthermore, in the case of testing failover in the Active-Active mode, the number of operating servers is more than two. Moreover, in the case of testing failover in the N-to-1 mode, the number of operating servers corresponds to the number of services provided, and the number of standby servers is one.

Therefore, the test-item extraction unit 18*e* uses the type of failover that is the subject for the test to generate the list 1 illustrated in FIG. 4. FIG. 4 is a diagram that illustrates an example of the list 1 that is generated by the failover diagnosis system according to the first embodiment. As illustrated in FIG. 4, in the list 1, the type of failover to be tested is related to the number of servers that are the subjects for a test.

For instance, in the example illustrated in FIG. 4, the test-item extraction unit 18*e* generates the list 1 that indicates that, for a test of failover in the Active-passive mode, the single operating server and the single standby server are the subjects for the test. Furthermore, in the example illustrated in FIG. 4, the test-item extraction unit 18*e* generates the list 1 that indicates that, for a test of failover in the Active-Active mode, two operating servers are the subjects for the test.

Furthermore, in the example illustrated in FIG. 4, the test-item extraction unit 18*e* generates the list 1 that indicates that, for a test of failover in the N-to-1 mode, two operating servers and a single standby server are the subjects for the test and that three operating servers and a single standby server are the subjects for the test.

The test-item extraction unit 18*e* then generates a list 2 in which the services designated by the user are exhaustively allocated to the to-be-tested servers. Specifically, in the case of a test in the Active-passive mode, the test-item extraction unit 18*e* allocates all of the services to a single operating server.

Furthermore, in the case of a test in the Active-Active mode, the test-item extraction unit 18*e* allocates all of the services to every operating server. Moreover, in the case of testing failover in the N-to-1 mode, the test-item extraction unit 18*e* distributes the services to each of the operating servers. In the case of testing failover in the N-to-1 mode, the services are allocated such that every operating server is provided with any of the services.

FIG. 5 is a diagram that illustrates an example of the list 2 that is generated by the failover diagnosis system according to the first embodiment. In the example illustrated in FIG. 5, the list 2 is a list that relates the list 1 illustrated in FIG. 4, the services allocated to the to-be-tested operating servers, and the standby servers. Furthermore, "Server#3" and "Server#4" illustrated in FIG. 5 are the servers that are omitted from the illustration of FIG. 1. Moreover, in the example illustrated in FIG. 5, the test-item extraction unit 18*e* allocates the three services A to C to the operating servers.

Specifically, in the example illustrated in FIG. 5, in the case of testing failover in the Active-passive mode, the test-item extraction unit 18*e* allocates the services A to C to Server#1 and sets Server#4 as a standby server. At that time, the test-item extraction unit 18*e* sets Server#2 and Server#3 as unused servers. Furthermore, in the case of testing failover in the Active-Active mode, the test-item extraction unit 18e allocates the services A to C to Server#1 and Server#2 and sets Server#3 and Server#4 as unused.

Furthermore, in the case of testing failover in the N-to-1 mode for two operating servers and a single standby server, the test-item extraction unit 18e allocates the service A and the service B to Server#1 and allocates the service C to Server#2. Alternatively, the test-item extraction unit 18e provides the service A to Server#1 and allocates the service B and the service C to Server#2. Moreover, in the case of testing failover in the N-to-1 mode for two operating servers and a single standby server, the test-item extraction unit 18e sets Server#4 as a standby server.

Furthermore, in the case of testing failover in the N-to-1 mode for three operating servers and a single standby server, the test-item extraction unit 18e allocates the service A to Server#1, allocates the service B to Server#2, and allocates the service C to Server#3. Furthermore, the test-item extraction unit 18e sets Server#4 as a standby server.

Next, the test-item extraction unit 18e generates a list that, with respect to each item of the list 2, exhaustively indicates the server into which a simulated error is injected and which is designated by the user. Specifically, the test-item extraction unit 18e generates a list 3 that exhaustively indicates the hardware of each server that is the destination into which a simulated error is injected and generates a list 4 that exhaustively indicates the service that is provided by each server that is the destination into which a simulated error is injected.

FIG. 6 is a diagram that illustrates an example of the list 3 that is generated by the failover diagnosis system according to the first embodiment. In the example illustrated in FIG. 6, the list 3 is a list that exhaustively relates the list 2 illustrated in FIG. 5 to the hardware into which a simulated fault is injected. In the example illustrated in FIG. 6, the test-item extraction unit 18e generates the list 3 that exhaustively allocates, to the destinations into which simulated faults are injected, CPUs and DIMMs (Dual Inline Memory Module), i.e., memories, of the servers that are used for testing various types of failover.

FIG. 7 is a diagram that illustrates an example of the list 4 that is generated by the failover diagnosis system according to the first embodiment. In the example illustrated in FIG. 7, the list 4 is a list that exhaustively relates the list 2 illustrated in FIG. 5 to the service into which a simulated fault is injected. In the example illustrated in FIG. 7, the test-item extraction unit 18e generates the list 4 that exhaustively allocates, to the destinations into which simulated faults are injected, the services that are implemented by the servers that are used for testing various types of failover. Furthermore, in the example illustrated in FIG. 7, the test-item extraction unit 18e generates the list 4 that indicates that errors are injected to hang up the services A to C that are implemented by the servers.

Furthermore, the test-item extraction unit 18e performs the following operation if a test is performed by simultaneously injecting multiple errors or adjusting the timing in which a simulated error is inserted, the status of load applied to a server, or the like. Specifically, in accordance with a designation from a user, the test-item extraction unit 18e generates a list that exhaustively relates the list 3 and the list 4 to simultaneous injection of multiple errors, the timing in which a simulated error is inserted, the status of load applied to a server, or the like.

With reference back to FIG. 2, if the test-possibility determination unit 18f acquires, from the test-item extraction unit 18e, a notification as to the test item and the to-be-tested server, the test-possibility determination unit 18f determines whether the notified test item can be executed. For example, the test-possibility determination unit 18f uses the hardware information and the diagnosis that are collected by the server monitoring unit 18d to determine whether there is a server that has a device configuration that is not suitable as the subject for a test, for example, whether there is a hardware fault, whether servers have the same device, or the like. If there is a server that has a device configuration that is not suitable as the subject for a test, the test-possibility determination unit 18f gives a notification to the user.

Furthermore, the test-possibility determination unit 18f refers to the list 3 and the list 4 that are generated by the test-item extraction unit 18e. The test-possibility determination unit 18f then uses the information that indicates the hardware of each of the servers 20 to 22 and that is collected by the server monitoring unit 18d and the diagnosis information on the hardware to determine whether each of the tests indicated by the list 3 and the list 4 can be performed.

If the test-possibility determination unit 18f determines that each of the tests can be performed, the test-order determination unit 18g performs the following operation in order to execute the notified test items in an efficient way. That is, the test-order determination unit 18g determines the order in which the test items are executed in an efficient way.

Furthermore, the test-order determination unit 18g divides the to-be-tested servers by multiple groups and determines whether the test of the notified item of the divided groups can be performed in parallel. If the test-order determination unit 18g determines that the test of the notified item of the divided groups can be performed in parallel, the test-order determination unit 18g notifies the simulated-fault injection timing control unit 18h of the servers included in each of the groups and the order in which the test of the groups are performed.

The simulated-fault injection timing control unit 18h uses the information collected by the server monitoring unit 18d to determine whether it is time to inject a simulated fault into the to-be-tested server. If the simulated-fault injection timing control unit 18h determines that it is timing to inject a simulated fault, the simulated-fault injection timing control unit 18h gives an instruction to the simulated-fault injection execution control unit 18i to inject a simulated fault.

Specifically, the simulated-fault injection timing control unit 18h refers to the list generated by the test-item extraction unit 18e so as to identify the timing in which to inject the simulated fault designated by the user. Furthermore, the simulated-fault injection timing control unit 18h uses the information that is collected by the server monitoring unit 18d to determine the status of the to-be-tested server. When the status of the to-be-tested server is the timing in which to inject the simulated fault designated by the user, the simulated-fault injection timing control unit 18h gives an instruction to the simulated-fault injection execution control unit 18i to inject a simulated fault.

When the status of the server into which a simulated fault is injected is the timing in which the simulated fault is injected, the simulated-fault injection execution control unit 18i injects the simulated fault into the server. Specifically, the simulated-fault injection execution control unit 18i gives an instruction to inject a simulated fault to the server delivery OS 16 that is executed by the server where a simulated fault occurs.

The result determination unit 18j performs a test to check whether each of the servers 20 to 22 has properly performed a failover. For example, the result determination unit 18j uses the information on each of the servers 20 to 22 that is collected by the server monitoring unit 18d to compare the service provided by each of the servers 20 to 22 before the simulated fault is injected with the service provided by each of the servers 20 to 22 after the simulated fault is injected. The result determination unit 18*j* then determines whether failover has been properly performed on the basis of the comparison result and the executed test item.

Next, an explanation is given of an operation performed by each of the units 19 to 19*d* that are included in the server delivery OS 16. The server control unit 19 is implemented when each of the servers 20 to 22 performs network booting with the server delivery OS 16, and it controls each of the units 19*a* to 19*d* so as to perform the following operation. Specifically, the server control unit 19 collects the hardware information that is included in the servers 20 to 22. Furthermore, the server control unit 19 diagnoses the status of the hardware included in the servers 20 to 22.

The server control unit 19 then transmits the collected hardware information and the status of the diagnosed hardware to the management server 10. Furthermore, if it receives an instruction from the management server 10 to inject a simulated fault, it injects a simulated fault into the servers 20 to 22. Moreover, the server control unit 19 has a function to perform failover and failback.

The configuration-information collection unit 19*a* collects the hardware information that is included in the server that executes the server delivery OS 16. The configuration-information collection unit 19*a* then notifies the hardware diagnosis unit 19*b* and the configuration-information notification unit 19*d* of the collected information.

For example, the configuration-information collection unit 19*a* notifies the hardware diagnosis unit 19*b* and the configuration-information notification unit 19*d* of the hardware information that indicates that the server 20 includes the LAN card 20*a*, the CPU 20*b*, the memory 20*c*, and the HDD 20*d*. Furthermore, the configuration-information collection unit 19*a* notifies the configuration-information notification unit 19*d* of the number of cores included in the CPU 20*b*, the type and capacity of the memory 20*c*, the capacity of the HDD 20*d*, the communication rate of the LAN card 20*a*, or the like.

The hardware diagnosis unit 19*b* diagnoses the status of the hardware included in the server that executes the server delivery OS 16. Specifically, the hardware diagnosis unit 19*b* uses the information collected by the configuration-information collection unit 19*a* to identify the hardware included in the server that executes the server delivery OS 16. The hardware diagnosis unit 19*b* then determines whether the identified hardware properly operates. The hardware diagnosis unit 19*b* then notifies the configuration-information notification unit 19*d* of the diagnosis.

When the simulated-fault injection unit 19*c* acquires, from the management server 10, an instruction to inject a simulated fault, the simulated-fault injection unit 19*c* injects a simulated fault into the server that executes the server delivery OS 16. For example, when the simulated-fault injection unit 19*c* of the server delivery OS 16 that is executed by the server 20 acquires, from the management server 10, an instruction to inject a simulated fault into the CPU, the simulated-fault injection unit 19*c* performs the following operation.

For example, the simulated-fault injection unit 19*c* performs an operation to invert a bit that is stored in a register of the CPU 20*b*, or the like, so as to inject a simulated error into the CPU 20*b*. Furthermore, for example, when the simulated-fault injection unit 19*c* acquires, from the management server 10, an instruction to inject a simulated fault into telnet (Telecommunication network), the simulated-fault injection unit 19*c* stops the telnet service.

The configuration-information notification unit 19*d* transmits, to the management server 10, the configuration information on the server that executes the server delivery OS 16. For example, the configuration-information notification unit 19*d* of the server delivery OS 16 that is executed by the server 20 acquires, from the configuration-information collection unit 19*a*, information on the LAN card 20*a*, the CPU 20*b*, the memory 20*c*, and the HDD 20*d*. Furthermore, the configuration-information notification unit 19*d* acquires, from the hardware diagnosis unit 19*b*, the diagnosis as to whether the LAN card 20*a*, the CPU 20*b*, the memory 20*c*, and the HDD 20*d* properly operate.

The configuration-information notification unit 19*d* then transmits the acquired hardware information and diagnosis to the management server 10. Furthermore, the hardware information and the diagnosis that are transmitted from the configuration-information notification unit 19*d* to the management server 10 are collected by the server monitoring unit 18*d* that is included in the failover diagnosis system 15.

Next, an explanation is given of an example of an operation performed by the management server 10, which implements the above-described failover diagnosis system 15, to perform a test to check whether the servers 20 to 22 properly execute failover. For example, the management server 10 uses the OS-image generation unit 18*a* to generate the server delivery OS 16 that includes the server control unit 19, the configuration-information collection unit 19*a*, the hardware diagnosis unit 19*b*, the simulated-fault injection unit 19*c*, and the configuration-information notification unit 19*d*. The management server 10 then generates an image file of the generated server delivery OS 16 and stores the generated image file in the HDD 13.

Next, the management server 10 uses the server-power control unit 18*b* to remotely turn on the power of each of the servers 20 to 22 and then uses the OS delivery unit 18*c* to transmit the image file of the server delivery OS 16 to each of the servers 20 to 22. Each of the servers 20 to 22 acquires the image file that is transmitted from the management server 10, stores the acquired image file in the memory, and performs network booting.

Each of the servers 20 to 22 then transmits, to the management server 10, the hardware information that is collected by the configuration-information collection unit 19*a* and the diagnosis that is obtained by the hardware diagnosis unit 19*b*. In this case, the management server 10 acquires the hardware information and the diagnosis and turns off the power of each of the servers 20 to 22.

The management server 10 then uses the test-item extraction unit 18*e* to perform the following operation. Specifically, the management server 10 acquires the contents of the test that is designated by the user. The management server 10 then extracts test items from the acquired contents of the test and generates the list 3 and the list 4 that indicate the test items. Furthermore, the management server 10 uses the test-possibility determination unit 18*f* to determine whether the tests indicated by the list 3 and the list 4 can be performed.

If the management server 10 determines that the tests indicated by the list 3 and the list 4 can be performed, the management server 10 performs the following operation. Specifically, the management server 10 uses the test-order determination unit 18*g* to determine the order in which the tests indicated by the list 3 and the list 4 are performed in an efficient way, divides the to-be-tested servers by multiple groups, and determines whether the test of the groups can be performed in parallel.

Next, the management server 10 uses the OS-image generation unit 18*a* to generate the server delivery OS 16 for each of the to-be-tested servers that are indicated by the list 3 and the list 4. At that time, the management server 10 generates the server delivery OS 16 that has a function to perform a failback operation so as to restore the status of the server to the pre-test status. The management server 10 then uses the server-power control unit 18b to turn on the power of the to-be-tested server and delivers the image file of the newly generated server delivery OS 16 to the to-be-tested server.

Furthermore, the management server 10 uses the simulated-fault injection timing control unit 18h to identify the timing in which a simulated fault is injected. When it is timing to inject a simulated fault, the management server 10 uses the simulated-fault injection execution control unit 18i to give an instruction to inject a simulated fault to the OS of the server where a fault occurs. If the management server 10 divides the to-be-tested servers by multiple groups and determines that the test of the groups can be performed in parallel, the management server 10 gives an instruction to inject a simulated fault to the OS of the server, where a fault occurs, in each of the groups.

After a simulated fault is injected, the management server 10 uses the information collected by the server monitoring unit 18d to determine the service that is provided by each of the servers. The management server 10 then uses the result determination unit 18j to perform the following operation. Specifically, the management server 10 determines whether failover, which is the subject for the test, is properly performed on the basis of the service provided by each of the servers and stores a determination result in the HDD 13.

Next, the management server 10 gives an instruction to the to-be-tested server to perform failback. In this case, the to-be-tested server performs failback. The management server 10 then uses the server monitoring unit 18d to collect the status of each of the servers and determines whether the to-be-tested server has properly performed failback. When the management server 10 determines that the to-be-tested server has properly performed failback, the management server 10 performs a new test that is indicated by the list 3 and the list 4.

Conversely, when the management server 10 determines that the to-be-tested server has not properly performed failback, the management server 10 performs the following operation. Specifically, the management server 10 uses the server-power control unit 18b to turn off the power of the to-be-tested server. The management server 10 then turns on the power of the to-be-tested server again and transmits the image file of the server delivery OS 16. Specifically, the management server 10 reboots the server that has not properly performed failback and causes it to perform network booting again. Afterward, the management server 10 performs a new test that is indicated by the list 3 and the list 4.

Furthermore, in the case of a failure of the hardware of the rebooted server, the management server 10 determines whether there is a failure of the hardware of the server due to the test and stores a result in the HDD 13. Furthermore, in the case of a failure of the hardware of the rebooted server, the management server 10 uses the test-item extraction unit 18e, the test-possibility determination unit 18f, and the test-order determination unit 18g to determine again the server that is used during each test and the test order and performs tests until all of the tests are completed.

Next, an explanation is given of a specific example of the operation performed by the management server 10. In the following explanation, a user designates eight servers, i.e., Server#1 to #8. Furthermore, in the following explanation, a user designates, as the types of failover, tests for failover in the Active-passive mode, failover in the Active-Active mode, and failover in the N-to-1 mode.

Furthermore, a user designates, as the type of service that is implemented by the to-be-tested server, the service using telnet and the service using http. Moreover, a user designates, as the type of simulated fault, a simulated fault that is injected into the CPU included in the to-be-tested server and a simulated fault that stops the FTP service.

In such a case, the management server 10 generates an image file of the server delivery OS 16 that includes the configuration-information collection unit 19a and the hardware diagnosis unit 19b. The management server 10 then turns on the power of each of the servers 20 to 22 and transmits the generated image file of the server delivery OS 16. In this case, each of the servers 20 to 22 performs network booting with the acquired image file of the server delivery OS 16.

Then, each of the servers 20 to 22 transmits the hardware configuration thereof and the diagnosis of each hardware to the management server 10. As a result, as illustrated in FIG. 8, the management server 10 acquires the hardware configuration of each server and the diagnosis of each hardware. FIG. 8 is a diagram that illustrates an example of information that is collected by the management server according to the first embodiment.

Furthermore, Server#3 to Server#8 illustrated in FIG. 8 are the servers that are omitted from FIG. 1, and they have the same functionality as the servers 20 to 22. Moreover, each of Server#1 to #8 includes a DIMM as a memory. Moreover, DIMM in FIG. 8 indicates the capacity of the memory that is included in each of Server#1 to #8, and LAN indicates the band of the LAN that is included in each of Server#1 to #8.

In the example illustrated in FIG. 8, the management server 10 acquires the information that indicates that Server#1 to #5 and #7 include two HDDs of 128 gigabytes, a single CPU, two DIMMs of 2 gigabytes, and two LANs with the band of 1 Gbps (Bit per second). Furthermore, the management server 10 acquires the information that indicates that Server#6 is a DISK-less server that does not include an HDD and is the same as Server#1 to #5 and #7 with respect to the CPU, DIMM, and the band of the LAN. Moreover, the management server 10 acquires the information that indicates that Server#8 includes two LANs with the band of 10 Gbps and is the same as Server#1 to #5 and #7 with respect to the HDD, CPU, and DIMM.

Furthermore, in the example illustrated in FIG. 8, the management server 10 acquires the diagnosis that indicates a failure of the HDD of Server#7 and acquires the diagnosis that indicates a failure of the DIMM of Server#8. As a result, the management server 10 determines that Server#8 cannot be a to-be-tested server due to the failure of the DIMM and sends a notification to the user.

As illustrated in FIG. 9, the management server 10 then generates a table that exhaustively relates the type of failover to be tested, the service that is implemented by each server, the server into which an error is injected, and the type of error to be injected.

FIG. 9 is a diagram that illustrates an example of the test that is performed by the management server according to the first embodiment. The table illustrated in FIG. 9 is a table that corresponds to the above-described list 3 and list 4. Furthermore, subject servers #1 to #3 in FIG. 9 represent the servers that are the subjects for a test, and Server#1 to #7 are applied exhaustively.

Specifically, as illustrated in FIG. 9, the management server 10 generates a table that exhaustively relates the mode of failover to be tested, the type of service that is provided by each of the subject servers #1 to #3, the server into which an error is injected, and the type of error to be injected. Next, in order to perform each test in an efficient way, the management server 10 divides Server#1 to #7 by multiple groups and generates a table that indicates the test order in which test of the divided groups are performed in parallel.

Furthermore, the management server 10 generates a table that indicates the condition of the hardware that is necessary to perform each test on the basis of the designated contents of a test, the server that is the subject for a test, the service that is implemented by each server, and the type of simulated fault to be injected. For example, the management server 10 generates the table that is illustrated in FIG. 10.

FIG. 10 is a diagram that illustrates an example of the table that is generated by the management server according to the first embodiment. The number of each test illustrated in FIG. 10 corresponds to the number of each test illustrated in FIG. 9. Furthermore, required hardware #1 illustrated in FIG. 10 is the hardware that is employed by the subject server #1 illustrated in FIG. 9 in order to perform a test, and required hardware #2 is the hardware that is employed by the subject server #2 illustrated in FIG. 9 in order to perform a test.

Furthermore, required hardware #3 is the hardware that is employed by the subject server #3 illustrated in FIG. 9 in order to perform a test. The number that is described in the field of each HDD in FIG. 10 indicates the free space of the HDD that is required to perform a test, and it is in the unit of gigabytes. The number that is described in the field of each CPU is the number of CPUs that are employed to perform a test. Furthermore, the number that is described in the field of each DIMM in FIG. 10 indicates the memory capacity that is employed to perform a test, and it is in the unit of gigabytes. Moreover, the number that is described in the field of each LAN in FIG. 10 indicates the band of the LAN that is employed to perform a test, and it is in the unit of Gbps.

Specifically, in the example illustrated in FIG. 10, the management server 10 generates a table that indicates that, with respect to each test, the number of CPUs that are necessary for the subject server #1 is one, the memory capacity is 1 gigabyte, and the band of the LAN is 1 Gbps. Furthermore, the management server 10 generates a table that indicates that, with respect to each test, the number of CPUs that are necessary for the subject server #2 is one, the memory capacity is 1 gigabyte, and the band of the LAN is 1 Gbps.

Furthermore, the management server 10 generates a table that indicates that two servers are necessary for the tests 1 to 6 and three servers are necessary for the tests 7 to 10. Moreover, the management server 10 generates a table that indicates that, with respect to the tests 7 to 10, the number of CPUs that are necessary for the subject server #3 is one, the memory capacity is 1 gigabyte, and the band of the LAN is 1 Gbps.

Next, in order to satisfy the table that is illustrated in FIG. 10 and obtain the highest operating rate of the to-be-tested server, the management server 10 uses a combination algorithm to determine the order in which tests are performed in parallel. For example, as illustrated in FIG. 11, the management server 10 determines a test that is to be performed by each of Server#1 to #7. FIG. 11 is a diagram that illustrates an example of the test that the management server according to the first embodiment causes each of the servers to perform.

In the example illustrated in FIG. 11, the management server 10 generates a table that indicates that, during the first test, Server#1 to #3 perform the test indicated by a test number 7 in FIG. 9 and Server#4 and #5 perform the test that is indicated by a test number 1 in FIG. 9. Furthermore, the management server 10 generates a table that indicates that, during the first test, Server#6 and #7 perform the test indicated by a test number 2 in FIG. 9.

Furthermore, the management server 10 generates a table that indicates that, during the second test, Server#1 to #3 perform the test indicated by a test number 8 in FIG. 9 and Server#4 and #5 perform the test that is indicated by a test number 3 in FIG. 9. Moreover, the management server 10 generates a table that indicates that, during the second test, Server#6 and #7 perform the test indicated by a test number 4 in FIG. 9.

Furthermore, the management server 10 generates a table that indicates that, during the third test, Server#1 to #3 perform the test indicated by a test number 9 in FIG. 9 and Server#4 and #5 perform the test that is indicated by a test number 5 in FIG. 9. Moreover, the management server 10 generates a table that indicates that, during the third test, Server#6 and #7 perform the test indicated by a test number 6 in FIG. 9.

Furthermore, the management server 10 generates a table that indicates that, during the fourth test, Server#1 to #3 perform the test indicated by a test number 10 in FIG. 9. Moreover, the management server 10 does not perform a test on Server#4 to #7 during the fourth test.

Furthermore, when the management server 10 generates the tables illustrated in FIGS. 9 and 11, the management server 10 performs the following operation. Specifically, the management server 10 generates the server delivery OS 16 that has a function necessary to perform the test numbers 1, 2, and 7. The management server 10 then transmits, to each of Server#1 to #7, the image file of the generated server delivery OS 16.

The management server 10 then injects a simulated error of the CPU into Server#1 and Server#4 and injects, into Server#6, a simulated fault to stop the telnet service. The management server 10 then determines whether each of Server#1 to #7 has properly performed failover and stores a determination result.

Next, the management server 10 gives an instruction to each of Server#1 to #7 to perform failback. The management server 10 then determines whether each of Server#1 to #7 has properly performed failback. Here, if each of Server#1 to #7 has not properly performed failback due to a defect that occurs in the OS executed by each of Server#1 to #7, or the like, the management server 10 performs the following operation.

First, the management server 10 registers, as an error, the difference between the status of each of Server#1 to #7 before the test and the status of each of Server#1 to #7 after the failback and notifies the error to a user. Furthermore, the management server 10 determines servers that are not faulty and determines whether the rest of the test can be continuously performed by using the servers that are not faulty.

If it is determined that it can be continuously performed, the management server 10 continuously performs the rest of the test. Conversely, if it is determined that it cannot be continuously performed, the management server 10 turns off the power of each of Server#1 to #7 and then turns it on again. Afterward, with respect to each of Server#1 to #7, the management server 10 generates the server delivery OS 16 that has a function necessary to perform the rest of the test and transmits, to each of Server#1 to #7, the image file of the generated server delivery OS 16.

The management server 10 then repeatedly performs an operation on each of Server#1 to #7 and failback four times. Afterward, the management server 10 presents a test result to the user. For example, the management server 10 presents the test result illustrated in FIG. 12 to the user. FIG. 12 is a diagram that illustrates an example of the test result that is presented to the user by the management server according to the first embodiment.

In the example illustrated in FIG. 12, the management server 10 displays an indication that ten tests have been performed and failover has not been properly performed with regard to a single test. Furthermore, the management server 10 displays the test result that indicates that the test for which failover has not been properly performed is the test indicated by the test number 9, the details of the test number 9, and the cause of the occurring error. Furthermore, the information on each of Server#1 to #7 while a test is being performed, the control trace information on the management server 10 during a test, the detailed information on a test result, or the like, may be displayed as the details of a test result. Moreover, the management server 10 may use a method of, not only displaying a test result, but also storing it in the HDD 13 so that a user may read and refer to it afterward.

As described above, the management server 10 generates the server delivery OS 16 that is executed by the to-be-tested server and generates an image file of the generated server delivery OS 16. The management server 10 then transmits the generated image file to the to-be-tested server. Afterward, the management server 10 injects a simulated fault into the server to which the image file has been transmitted, and performs a test to check whether failover is properly performed.

Therefore, the management server 10 is capable of continuously testing the failover capability. Specifically, in some cases, the OS of the to-be-tested server is not started up due to damage to data in an IO (Input Output) recording medium, such as an HDD, and failback is not properly performed. However, the management server 10 transmits the image file of the server delivery OS 16 to the to-be-tested server for network booting. As a result, even if the to-be-tested server does not perform failback properly, the management server 10 does not need to install the OS and is capable of continuously testing the failover capability.

In the case of exhaustively testing failover, tests are exhaustively performed in accordance with a combination of the type of failover, the type of simulated fault, the contents of the service provided, the timing in which a simulated fault is injected, the number of servers, or the like. However, the types of failover are increasing in accordance with an advance in technology, and there are many areas into which a simulated fault is injected. Therefore, it is difficult to exhaustively perform a failover test manually, i.e., by using a jig, or the like.

However, the management server 10 exhaustively combines the type of failover to be tested, the type of simulated fault to be injected, the type of service provided, the server that is the subject for the test, or the like, and automatically performs a test. Thus, the management server 10 is capable of easily performing a failover test.

Furthermore, it is difficult to exhaustively perform a failover test at a predetermined timing by using a jig, or the like. Specifically, the status of a server into which a simulated fault is injected is not always stable. Furthermore, during a failover test, tests of all cases are performed based on assumptions about operations and therefore, in some cases, for example, a simulated fault is further injected during failover. However, as failover is finished instantly (about several milliseconds to several seconds), it is difficult to manually inject a new simulated fault during failover.

However, the management server 10 generates the server delivery OS 16 that has a function to transmit, to the management server 10, the information that indicates the status of the to-be-tested server, and transmits the image file of the generated server delivery OS 16 to the to-be-tested server. The management server 10 then uses the information that is collected from each server to monitor the status of the to-be-tested server and injects a simulated fault when it is determined that it is timing to inject a simulated fault. Thus, the management server 10 is capable of injecting a simulated fault at any timing.

Figure 13:
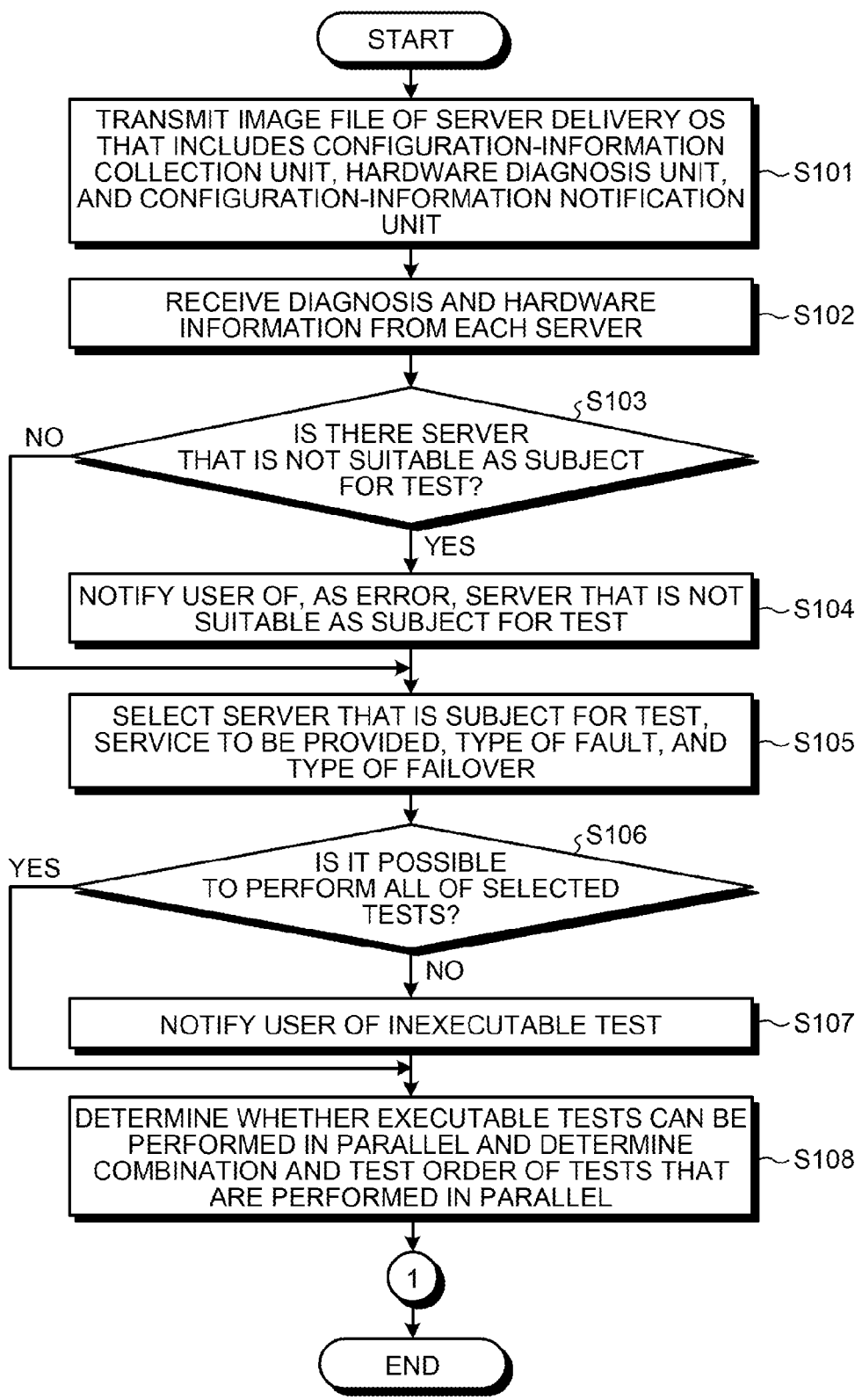
FIG. 13 is a first flowchart that illustrates the flow of an operation performed by the management server according to the first embodiment.
Figure 14:
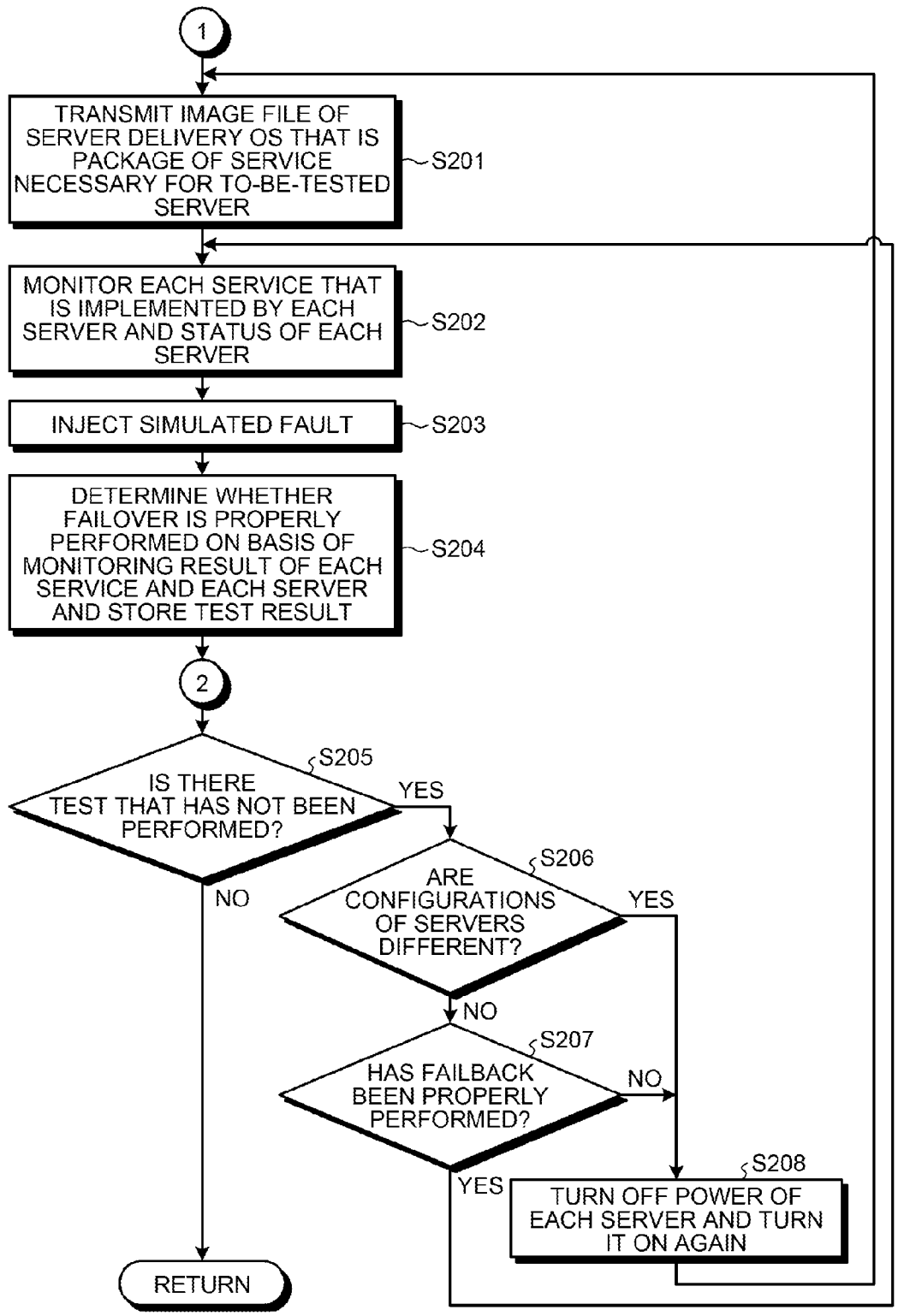
FIG. 14 is a second flowchart that illustrates the flow of an operation performed by the management server according to the first embodiment.
Figure 15:
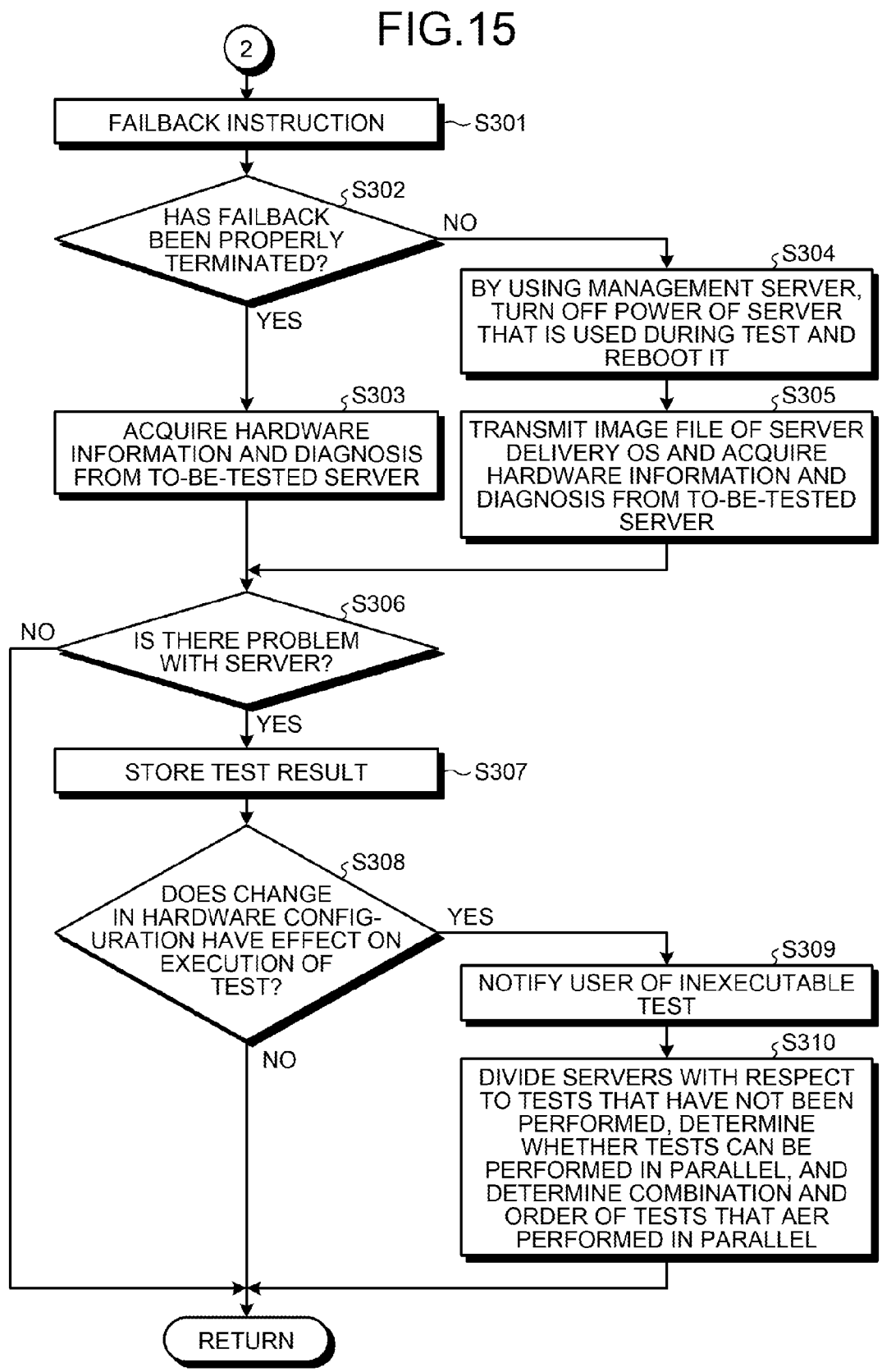
FIG. 15 is a third flowchart that illustrates the flow of an operation performed by the management server according to the first embodiment.

Next, an explanation is given, with reference to FIGS. 13 to 15, of the flow of an operation performed by the management server 10. FIG. 13 is a first flowchart that illustrates the flow of an operation performed by the management server according to the first embodiment. Furthermore, FIG. 14 is a second flowchart that illustrates the flow of an operation performed by the management server according to the first embodiment. Moreover, FIG. 15 is a third flowchart that illustrates the flow of an operation performed by the management server according to the first embodiment.

For instance, in the example illustrated in FIG. 13, the management server 10 transmits, to all of the servers 20 to 22 in the information processing system 1, the image file of the server delivery OS 16 that includes the configuration-information collection unit 19a, the hardware diagnosis unit 19b, and the configuration-information notification unit 19d (Step S101). Then, it receives the diagnosis and the hardware information from each of the servers 20 to 22 (Step S102). Next, the management server 10 determines whether there exists a server that is not suitable as the subject for a test (Step S103) and, if it is determined that it exists (Yes at Step S103), it notifies the user of, as an error, the server that is not suitable as the subject for a test (Step S104). Conversely, if it is determined that there does not exist a server that is not suitable as the subject for a test (No at Step S103), the operation at Step S104 is skipped.

Next, in accordance with an instruction from the user, the management server 10 selects the server that is the subject for a test, the service to be provided, the type of simulated fault to be injected, and the type of failover to be tested (Step S105). The management server 10 then determines whether it is possible to perform failover tests of all of the types selected (Step S106). If it is determined that any failover test is not possible (No at Step S106), the management server 10 notifies the user of the inexecutable test (Step S107). Conversely, if it is possible to perform failover tests of all of the types selected (Yes at Step S106), the management server 10 skips the operation at Step S107.

The management server 10 then divides the servers by multiple groups with respect to the executable tests, determines whether the tests can be performed in parallel and, if they are executable, determines the combination and the order of the tests that are performed in parallel (Step S108). Afterward, the management server 10 performs the operation illustrated in FIG. 14 and terminates the operation.

Next, an explanation is given, with reference to FIG. 14, of the flow of an operation performed by the management server 10. After the management server 10 performs the operation at Step S108 illustrated in FIG. 13, the management server 10 generates a new image file of the server delivery OS 16 that has a function necessary for the to-be-tested server and transmits the image file to the to-be-tested server (Step S201). The management server 10 then monitors the service that is implemented by each of the to-be-tested servers and the status of each of the servers (Step S202).

Next, the management server 10 injects a simulated fault into a server where a fault occurs (Step S203). The management server 10 then determines whether failover is properly performed on the basis of the monitoring result of each service and the status of each server and stores a test result (Step S204).

After performing the operation illustrated in FIG. 15, the management server 10 then determines whether there is a test that has not been performed (Step S205). If it is determined that there is a test that has not been performed (Yes at Step S205), the management server 10 determines whether there is a difference between the configuration of a server that is the subject for the subsequently performed test and the configuration of a server that is the subject for the current test (Step S206). If it is determined that the configurations of the servers are the same (No at Step S206), the management server 10 determines whether failback has been properly performed (Step S207).

If it is determined that failback has not been properly performed (No at Step S207), the management server 10 turns off the power of the to-be-tested server and reboots it (Step S208) and performs the operation at Step S201 again. Furthermore, if it is determined that failback has been properly performed (Yes at Step S207), the management server 10 does not turn off the power of the to-be-tested server but performs the operation at Step S202 again. If it is determined that the configurations of the servers are different (Yes at Step S206), the management server 10 turns off the power of each server and reboots it (Step S208). Furthermore, if it is determined that there is no test that has not been performed (No at Step S205), the management server 10 terminates the operation.

Next, an explanation is given, with reference to FIG. 15, of the flow of an operation performed by the management server 10. For example, if the management server 10 performs the operation at Step S204 in FIG. 14, the management server 10 gives an instruction to the to-be-tested server to perform failback (Step S301). The management server 10 then determines whether failback has been properly performed (Step S302) and, if it is determined that it has been properly performed (Yes at Step S302), performs the following operation.

Specifically, the management server 10 acquires the hardware information and the diagnosis from the to-be-tested server (Step S303). Conversely, if it is determined that failback has not been properly performed (No at Step S302), the management server 10 turns off the power of the to-be-tested server and reboots it (Step S304). The management server 10 then transmits the server delivery OS 16 to the to-be-tested server for network booting (Step S305).

Next, the management server 10 identifies the status of each server and determines whether there is a problem with a to-be-tested server (Step S306). Specifically, the management server 10 determines whether a failure, or the like, occurs due to a test and whether the hardware and the device configuration are different than the pre-test ones. If it is determined that there is a problem with the to-be-tested server (Yes at Step S306), the management server 10 stores a test result (Step S307) and determines whether the problem that occurs in the to-be-tested server has any effect on the continuation of the test (Step S308).

If it is determined that the problem that occurs in the to-be-tested server has any effect on the continuation of the test (Yes at Step S308), the management server 10 notifies the user of the inexecutable test (Step S309). Afterward, the management server 10 divides the to-be-tested servers by multiple groups with respect to the tests that have not been performed, determines whether they are executable and, if they are executable, determines the contents and the order of operations that are performed in parallel (Step S310).

Afterward, the management server 10 terminates the operation. Furthermore, if it is determined that problem that occurs in the to-be-tested server does not have any effect on the continuation of the test (No at Step S308), the management server 10 performs Step S205 that is illustrated in FIG. 14. Moreover, if it is determined that there is no problem with the server (No at Step S306), the management server 10 performs Step S205 that is illustrated in FIG. 14.

Figure 16:
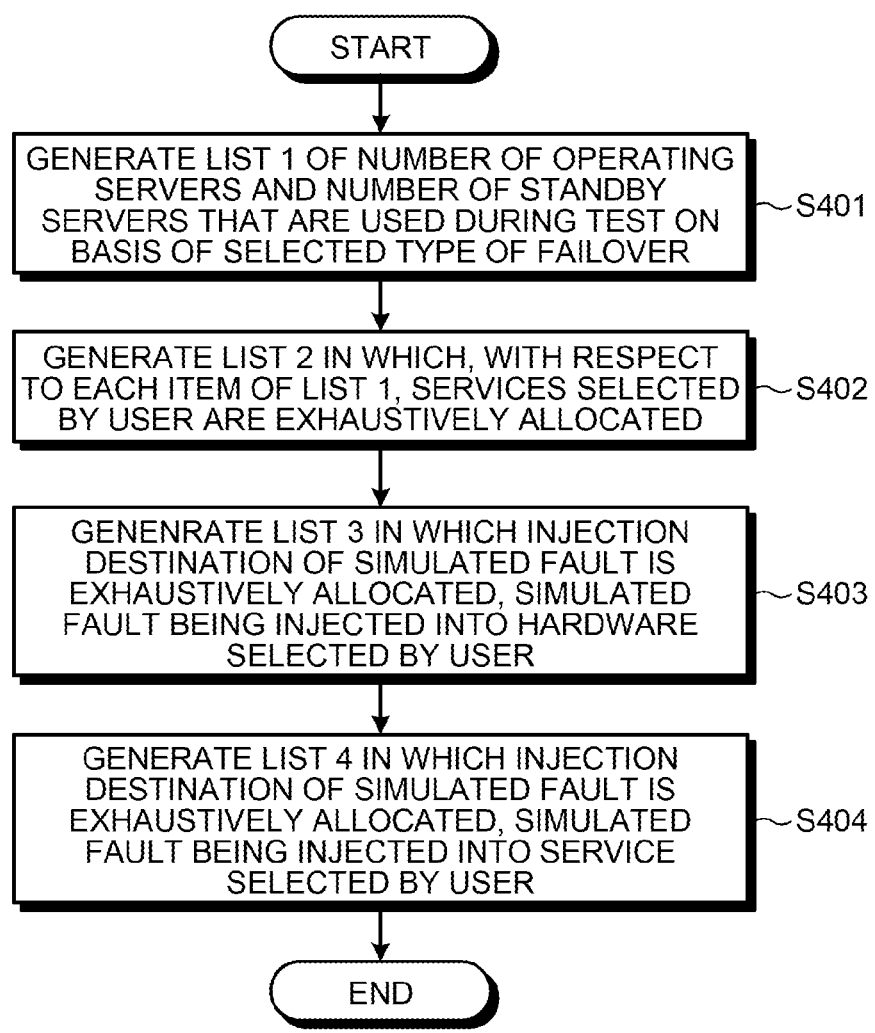
FIG. 16 is a flowchart that illustrates an example of the flow of an operation performed by the management server according to the first embodiment to generate a list that indicates the contents of a test.

Next, an explanation is given, with reference to FIG. 16, of an example of the flow of an operation performed by the management server 10 to generate the list that indicates the contents of a test. FIG. 16 is a flowchart that illustrates an example of the flow of an operation performed by the management server according to the first embodiment to generate the list that indicates the contents of a test. The management server 10 performs the operation illustrated in FIG. 16 at Step S105 that is illustrated in FIG. 13 so as to generate the list that indicates the server that is the subject for a test, a service, the type of simulated fault to be injected, and the type of failover to be tested.

For instance, in the example illustrated in FIG. 16, the management server 10 generates the list 1 that indicates the number of to-be-tested operating servers and the number of standby servers on the basis of the type of failover that is selected by a user (Step S401). Next, the management server 10 generates the list 2 in which, with respect to each item of the list 1, the provided services are exhaustively allocated to the operating servers, the provided services being selected by the user (Step S402).

The management server 10 then generates the list 3 in which the injection destination of a simulated fault is exhaustively allocated to every item of the list 2, the simulated fault being injected into the hardware that is selected by the user (Step S403). Furthermore, the management server 10 generates the list 4 in which the injection destination of a simulated fault is exhaustively allocated to every item of the list 2, the simulated fault being injected into the service that is selected by the user (Step S404), and terminates the operation.

Advantage of the Management Server 10

As described above, the management server 10 generates the server delivery OS 16 that is executed by the to-be-tested server and generates an image file of the generated server delivery OS 16. The management server 10 then transmits the generated image file to the to-be-tested server. Furthermore, the management server 10 injects a simulated fault into the server to which the image file has been transmitted and performs a test to check whether failover is properly executed. Furthermore, each time a test is performed, the management server 10 causes the to-be-tested server to perform failback and determines whether a failback operation has been properly performed. If the failback operation has not been properly performed, the management server 10 turns off the power of the to-be-tested server and then turns it on again, thereby rebooting the to-be-tested server. Afterward, the management server 10 transmits the image file of the server delivery OS 16 again and repeatedly performs a failover test.

Therefore, even if the OS, or the like, of the to-be-tested server is damaged due to injection of a simulated fault and failback is not properly performed, the management server 10 is capable of performing a new test without reinstalling the OS. Thus, the management server 10 is capable of continuously testing the failover capability. Furthermore, only when failback is not properly performed, the management server 10 causes the to-be-tested server to network boot. As a result, the management server 10 can prevent unnecessary execution of network booting and can perform tests in an efficient manner.

Furthermore, the management server 10 collects the hardware information on the to-be-tested server and selects a to-be-tested server on the basis of the collected information. The management server 10 then transmits the image file of the server delivery OS 16 to the selected server. Thus, the management server 10 is capable of removing, from the subjects for a test, the server that is not testable, thereby performing tests in a more efficient manner.

Furthermore, the management server 10 receives, from a user, designations with respect to the type of simulated fault to be injected and the type of failover to be tested. On the basis of the hardware information on the to-be-tested servers, the management server 10 then selects a plurality of servers that includes a server into which the designated type of simulated fault can be injected and a plurality of servers on which the designated type of failover can be performed. Thus, the management server 10 is capable of automatically performing the tests of the contents that are designated by the user.

Furthermore, the management server 10 divides the servers, which are selected as the subjects for the test, by multiple groups and determines whether a failover test of the groups can be performed in parallel. If it is determined that the failover test of the groups can be performed in parallel, the management server 10 injects a simulated fault in each of the groups and performs a test to check whether failover is properly performed. Thus, the management server 10 performs a plurality of tests in parallel, whereby the time for the tests can be shortened.

Furthermore, on the basis of the hardware information on the to-be-tested servers, the management server 10 determines the order in which the to-be-tested servers perform failover in an efficient way. The management server 10 then injects a simulated fault so that failover is performed in the determined order. As a result of the efficient execution of tests, even if many tests need to be performed, the management server 10 can reduce the time for the tests.

Furthermore, the management server 10 collects the contents of the implemented service and the hardware information from each of the to-be-tested servers and monitors the status of each of the servers on the basis of the collected contents of the service and the collected hardware information. The management server 10 then identifies the timing in which a simulated fault is injected into each of the servers on the basis of the monitored status and injects a simulated fault in the identified timing. Thus, even if the timing for injecting a simulated fault is short and it is difficult to perform a test, the management server 10 is capable of performing a test to check whether failover is properly executed.

Moreover, the management server 10 transmits the image file of the server delivery OS 16 to the memory, i.e., the RAM, of the to-be-tested server. Specifically, the management server 10 causes the to-be-tested server to network boot with the image file of the server delivery OS 16. Thus, the management server 10 does not need to perform an operation to reinstall the OS in the to-be-tested server and can continuously perform tests.

[b] Second Embodiment

Although the embodiment of the present invention is described above, the embodiment may be implemented in various different forms other than the above-described embodiment. Therefore, an explanation is given below, as a second embodiment, of another embodiment that is included in the present invention.

With Regard to Network Booting

The above-described management server 10 uses the PXE boot technique to network boot each of the servers 20 to 22 with the server delivery OS 16. However, the embodiment is not limited to this. For example, the management server 10 may use the DMA (Direct memory Access) technology to store the image file of the server delivery OS 16 directly in DIMMs 20c to 22c of the servers 20 to 22. Furthermore, the management server 10 may use any method as long as it network boots each of the servers 20 to 22 with the server delivery OS 16.

With Regard to Contents of Test

In the above explanation, the type of failover that is subjected to a test by the management server 10, the provided service, and the type of simulated fault to be injected are only examples, and the management server 10 can set any type of failover as the subject for a test. Furthermore, the management server 10 can cause the to-be-tested server to provide any service. Moreover, the management server 10 can inject any type of simulated fault.

For example, the type of failover may be other than the above-described types, and a method may be used to allocate a service to a different server in a random manner. Furthermore, an example of the simulated fault of the hardware may be blocking of an access to the shared drive 23, power-supply disconnection, reboot, deviation from the control on a cluster that is a group of to-be-tested servers, or the like. Furthermore, an example of a simulated fault of the software may be a method of applying a load to a server and slowing down the speed at which a service is provided, or the like. Moreover, the service provided by a server may be provision of SSH (Secure Shell), or the like.

Furthermore, the timing in which the management server 10 injects a simulated fault is when failover is being executed, when failback is being executed, when a high load is applied to a service, during a function operation, during a stable operation, or the like. Furthermore, a management server 10a may inject a simulated fault while each of virtual servers 20e to 22e performs live migration.

With Regard to to-be-Tested Server

The above-described management server 10 performs a test to check whether the physical servers 20 to 22 included in the information processing system 1 properly perform failover. However, the embodiment is not limited to this and, for example, the management server 10 may determine whether virtual servers properly perform failover.

Figure 17:
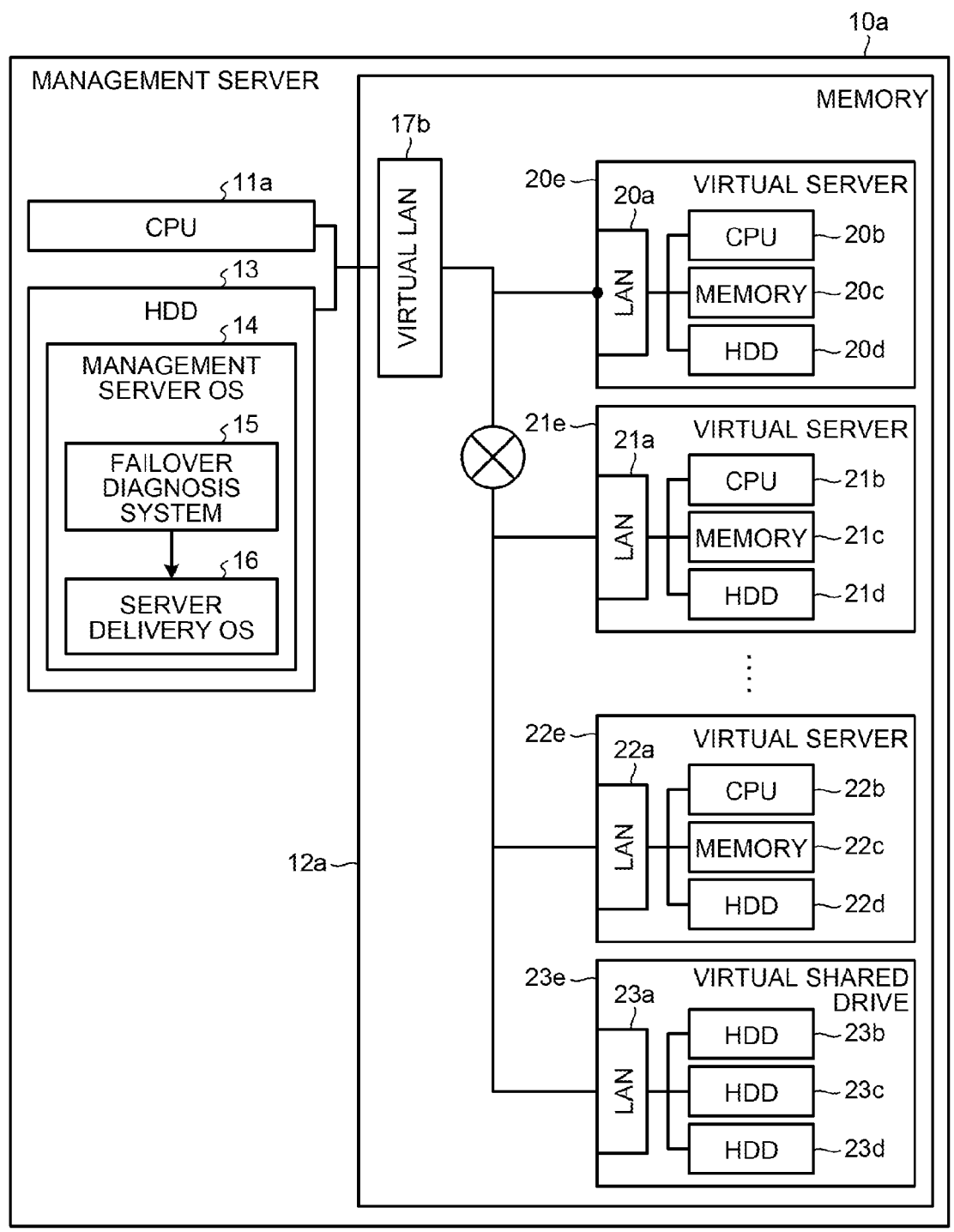
FIG. 17 is a diagram that illustrates an example of an operation performed by a management server according to a second embodiment to perform a failover test on virtual servers.
Figure 18A:
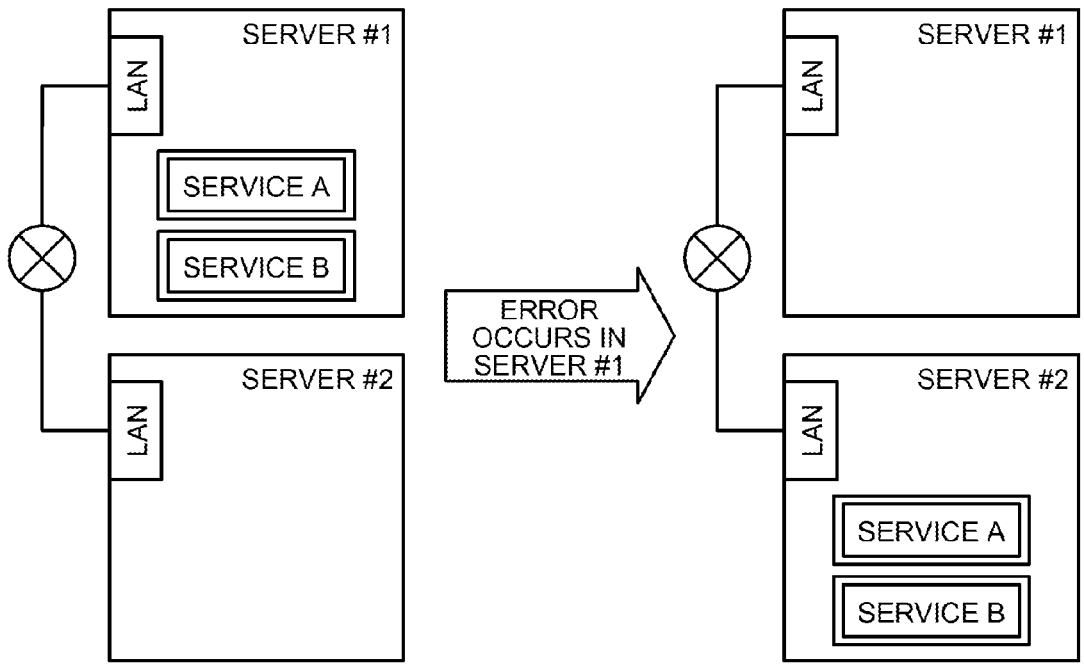
FIG. 18A is a diagram that illustrates a failover capability in an Active-passive mode.
Figure 18B:
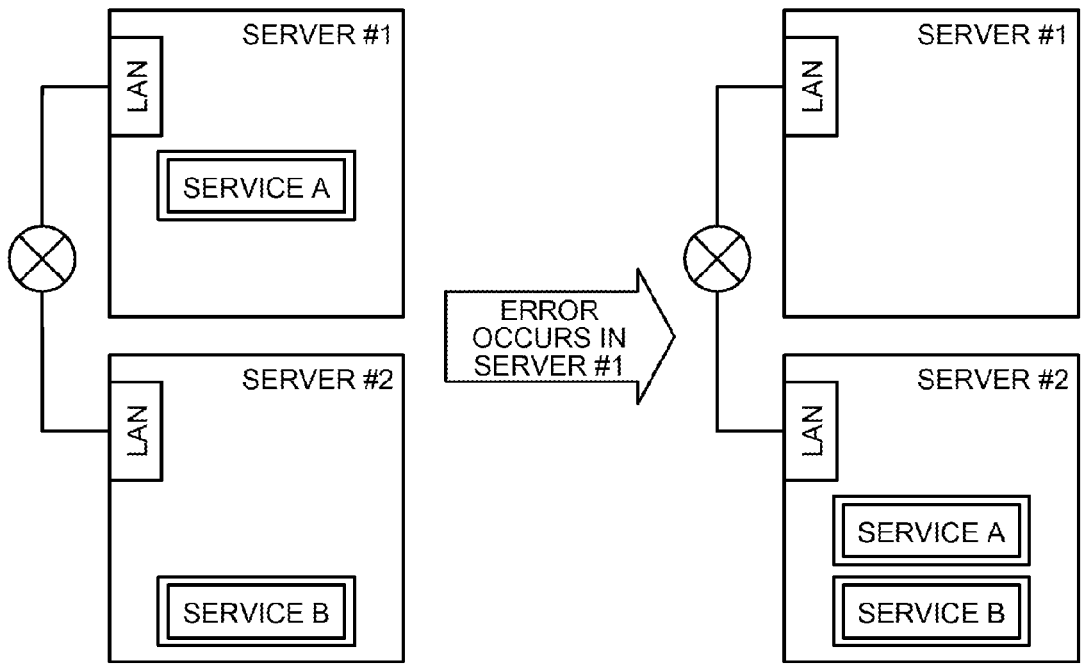
FIG. 18B is a diagram that illustrates a failover capability in an Active-Active mode.
Figure 18C:
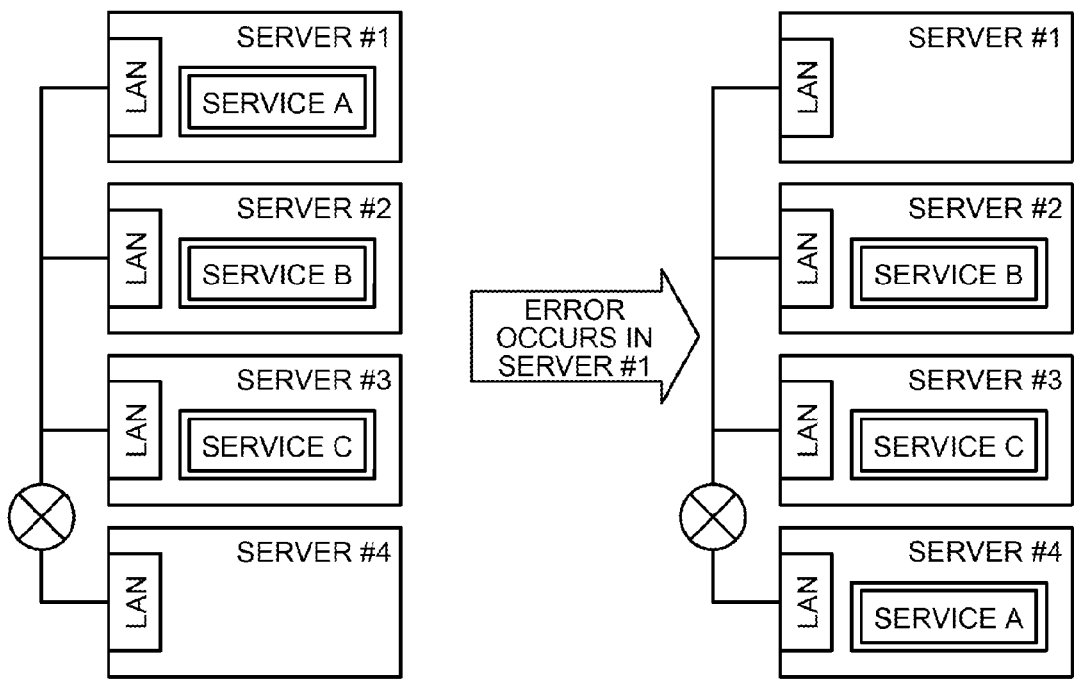
FIG. 18C is a diagram that illustrates a failover capability in an N-to-1 mode.
Figure 18D:
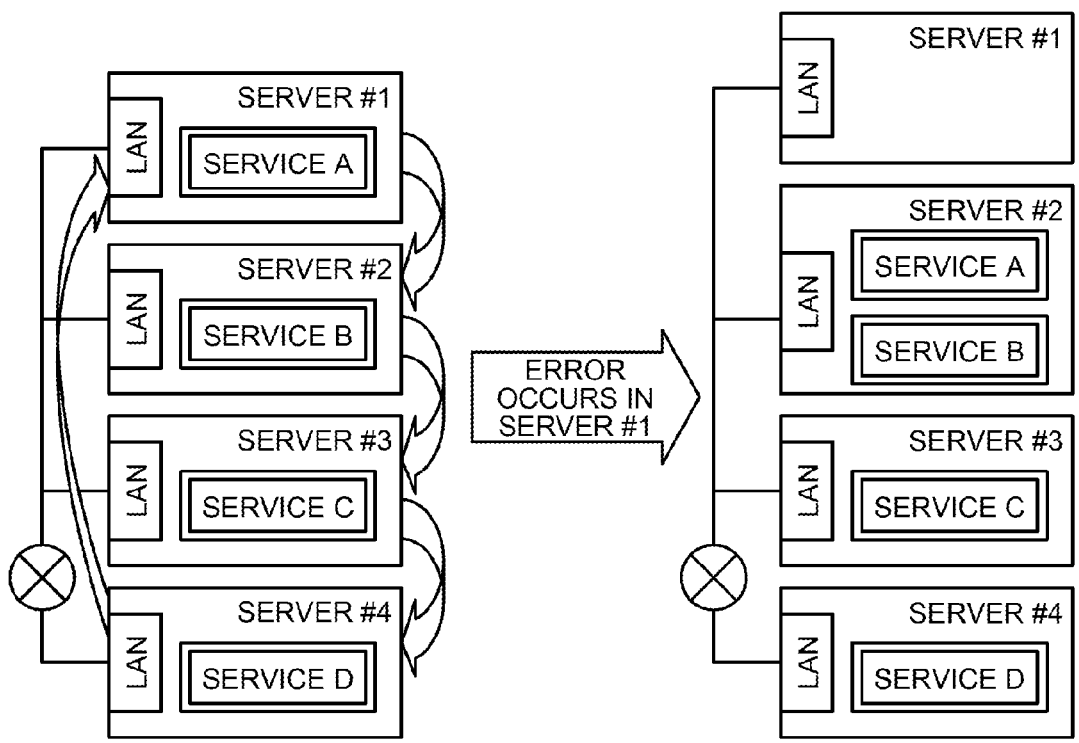
FIG. 18D is a diagram that illustrates a ring-type failover capability.
Figure 19:
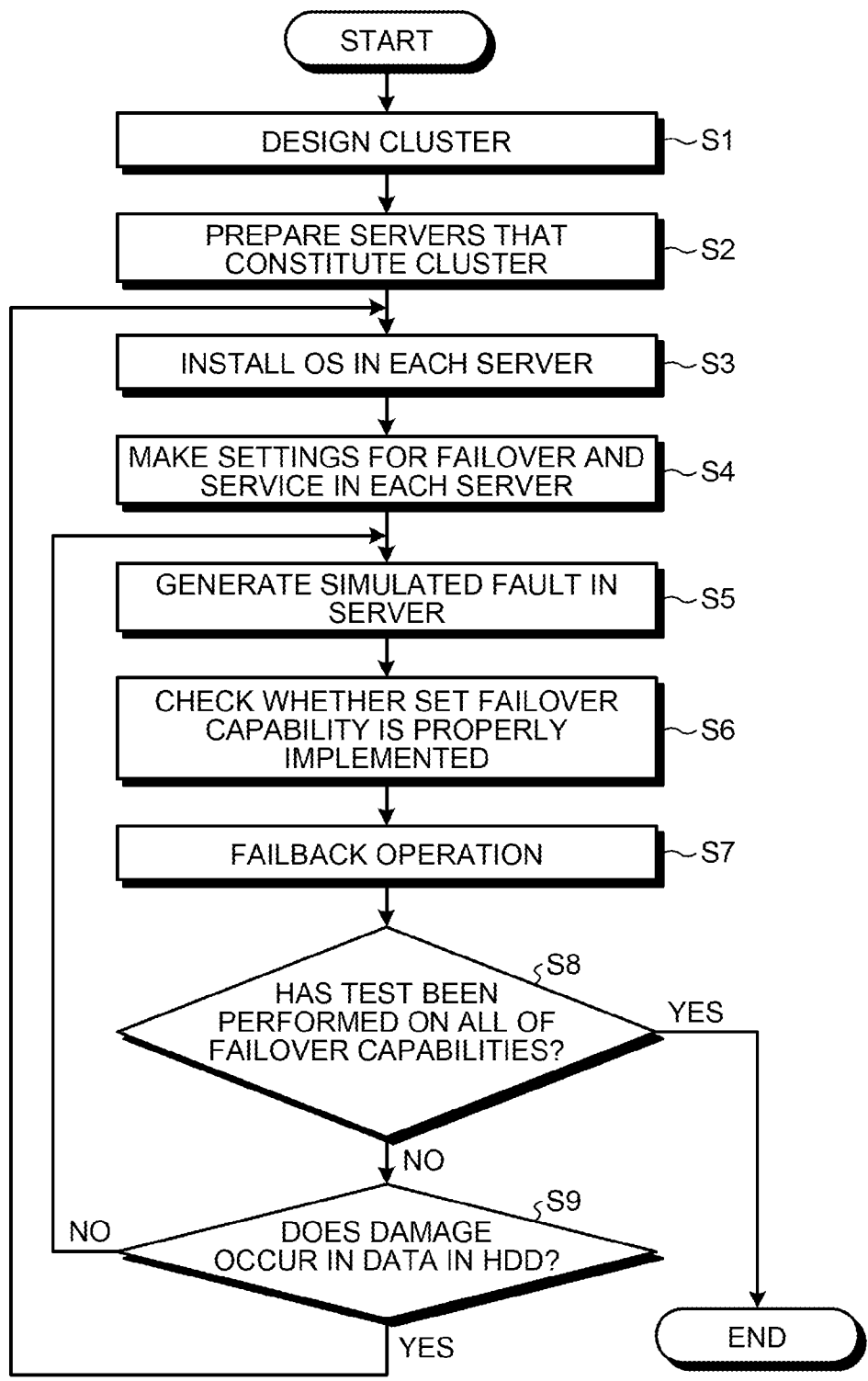
FIG. 19 is an example of the flowchart that illustrates the steps of a cluster failover test.

FIG. 17 is a diagram that illustrates an example of an operation performed by a management server according to the second embodiment to perform a failover test on virtual servers. In the example illustrated in FIG. 17, the management server 10a includes a CPU 11a and a memory 12a. The HDD 13, the management server OS 14, the failover diagnosis system 15, and the server delivery OS 16, which are included in the management server 10a, have the same functionalities as those of the units 13 to 16 included in the management server 10, and explanations thereof are omitted.

The memory 12a includes a virtual LAN 17b, the virtual servers 20e to 22e, and a virtual shared drive 23e. Furthermore, the virtual servers 20e to 22e are virtual servers that have the same functionalities as those of the servers 20 to 22 according to the first embodiment. The CPU 11a implements a virtual network that includes the virtual LAN 17b, the virtual servers 20e to 22e, and the virtual shared drive 23e.

When the above-described management server 10a performs a test to check whether each of the virtual servers 20e to 22e properly performs failover, the management server 10a transmits the image file of the server delivery OS 16 to each of the virtual servers 20e to 22e for network booting. The management server 10a then performs a test to check whether each of the virtual servers 20e to 22e properly performs failover. Therefore, even if each of the virtual servers 20e to 22e does not perform failback properly, the management server 10a is capable of continuously performing tests without generating each of the virtual servers 20e to 22e again or without reinstalling the OS.

With Regard to List

The above-described management server 10 generates the lists 1 to 4 in accordance with the contents of the test that is designated by a user or the status of each of the servers 20 to 22. However, the embodiment is not limited to this. Specifically, the management server 10 may use a combination algorithm to generate the lists 3 and 4 in accordance with the contents of the test that is designated by a user or the status of each of the servers 20 to 22. Furthermore, the management server 10 may, without generating the lists 1 to 4, use a combination algorithm to determine the contents of a test that is designated by a user in accordance with the contents of the test or the status of each of the servers 20 to 22 and perform a test of the determined contents.

According to one aspect, it is possible to continuously test the failover capability of an information processing system.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A testing server that performs a test to check whether a plurality of servers properly executes failover, the testing server comprising:
   a generation unit that generates an image file of an OS (Operation System) that is executed by a to-be-tested server;
   a transmitting unit that transmits the image file that is generated by the generation unit to to-be-tested servers;
   a testing unit that injects a simulated fault into a server where a fault occurs among the servers to which the transmitting unit transmits the image file and that performs a test to check whether the to-be-tested server properly executes failover;
   a restoring unit that, each time the testing unit performs a test, restores a status of the to-be-tested server to a pre-failover status;
   a judgment unit that judges whether the restoring unit properly restores the status of the to-be-tested server; and
   a power control unit that, when the judgment unit judges that the status of the to-be-tested server is not properly restored, turns off power of the to-be-tested server and then turns on the power again, wherein
   with respect to the server whose power is turned on again by the power control unit, the transmitting unit transmits an image file and the testing unit performs a test in a repetitive manner.

2. The testing server according to claim 1, comprising:
   a collection unit that collects information that indicates details of a device that is included in each server; and
   a selection unit that selects a to-be-tested server in accordance with the information collected by the collection unit, wherein
   the transmitting unit transmits the image file to the server that is selected as a subject for a test by the selection unit.

3. The testing server according to claim 2, comprising:
   a receiving unit that receives, from a user, designations with respect to a type of simulated fault to be injected into the server and a type of failover to be executed by the server, wherein
   the selection unit uses the information that is collected by the collection unit to select a plurality of servers that includes a server into which the type of simulated fault received by the receiving unit is injectable and that is capable of executing the type of failover received by the receiving unit.

4. The testing server according to claim 3, comprising a determination unit that divides the plurality of servers selected by the selection unit by multiple groups and that determines whether the type of failover received by the receiving unit is executable in the groups in parallel, wherein
   when the determination unit determines that the type of failover received by the receiving unit is executable in the groups in parallel, the testing unit injects the type of simulated fault received by the receiving unit into each of the groups and performs a test to check whether failover is properly executed.

5. The testing server according to claim 4, wherein the testing unit determines an order in which the servers efficiently execute all types of failover received by the receiving unit, the servers being selected by the selection unit in accordance with the information that is collected by the collection unit and that indicates details of a device included in each of the servers, and injects a simulated fault into the server where a fault occurs such that failover is executed in the determined order.

6. The testing server according to claim 1, comprising:
   a monitoring unit that monitors a status of a server to which the transmitting unit transmits an image file; and
   an identifying unit that uses the status of each server that is monitored by the monitoring unit to identify a timing in which a simulated fault is injected into the server, wherein
   the testing unit injects a simulated fault into the server at the timing identified by the identifying unit and performs a test to check whether failover is properly executed.

7. The testing server according to claim 1, wherein the transmitting unit transmits the image file generated by the generation unit to a RAM (Random Access Memory) that is included in the server.

8. An information processing system that includes a plurality of servers that executes failover when a fault occurs in any of the servers and a testing server that performs a test to check whether each of the servers properly executes failover, wherein
   the testing server includes
   a generation unit that generates an image file of an OS that is executed by a to-be-tested server;
   a transmitting unit that transmits the image file that is generated by the generation unit to to-be-tested servers;
   a testing unit that injects a simulated fault into a server where a fault occurs among the servers to which the transmitting unit transmits the image file and that performs a test to check whether the to-be-tested server properly executes failover;
   a restoring unit that, each time the testing unit performs a test, restores a status of the to-be-tested server to a pre-failover status;

a judgment unit that judges whether the restoring unit properly restores the status of the to-be-tested server; and a power control unit that, when the judgment unit judges that the status of the to-be-tested server is not properly restored, turns off power of the to-be-tested server and then turns on the power again, with respect to the server whose power is turned on again by the power control unit, the transmitting unit transmits an image file and the testing unit performs a test in a repetitive manner, and the server performs network booting with the image file.

9. A testing method that is performed by a testing server that performs a test to check whether a plurality of servers properly executes failover, the servers executing failover when a fault occurs in any of the servers, the testing method comprising:

generating an image file of an OS that is executed by a to-be-tested server;

transmitting the generated image file to to-be-tested servers;

injecting a simulated fault into a server where a fault occurs among the servers to which the image file is transmitted and performing a test to check whether the to-be-tested server properly executes failover;

each time a test is performed, restoring a status of the to-be-tested server to a pre-failover status;

judging whether the status of the to-be-tested server is properly restored;

when it is judged that the status of the to-be-tested server is not properly restored, turning off power of the to-be-tested server and then turning on the power again; and with respect to the server whose power is turned on again, transmitting the image file and performing the test in a repetitive manner.

* * * * *